(12) United States Patent
Lie et al.

(10) Patent No.: US 12,739,316 B2
(45) Date of Patent: Sep. 15, 2026

(54) DATA TYPE SEPARATION FOR AIRCRAFT MISSION SYSTEMS DIGITAL BACKBONE

(71) Applicant: Textron Innovations Inc., Providence, RI (US)

(72) Inventors: Milton Lie, Allen, TX (US); Adam Menard, Aledo, TX (US); Joseph McKnight, Fort Worth, TX (US); Andrew Crumrine, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 102 days.

(21) Appl. No.: 18/893,277

(22) Filed: Sep. 23, 2024

(65) Prior Publication Data

US 2026/0089241 A1 Mar. 26, 2026

(51) Int. Cl.

| | |
|---|---|
| ***H04L 69/16*** | (2022.01) |
| ***G06F 15/16*** | (2006.01) |
| ***H04L 12/56*** | (2006.01) |
| ***H04L 15/16*** | (2006.01) |
| ***H04L 67/1097*** | (2022.01) |
| ***H04L 67/12*** | (2022.01) |

(52) U.S. Cl.

CPC ........ *H04L 69/161* (2013.01); *H04L 67/1097* (2013.01); *H04L 67/12* (2013.01)

(58) Field of Classification Search

CPC .... H04L 69/161; H04L 67/1097; H04L 67/12

USPC .......................................................... 709/230

See application file for complete search history.

(56) References Cited

U.S. PATENT DOCUMENTS

| | | | | |
|---|---|---|---|---|
| 9,494,933 | B1 * | 11/2016 | Jackson | H04L 45/243 |
| 2012/0053915 | A1 * | 3/2012 | Falash | H04L 67/131 703/6 |
| 2012/0254474 | A1 * | 10/2012 | Brown | H04L 41/00 710/8 |
| 2013/0060942 | A1 * | 3/2013 | Ansari | H04L 67/141 709/225 |

(Continued)

OTHER PUBLICATIONS

"Time-Sensitive Networking for Aerospace Onboard Ethernet Communications," Draft Standard for Local and Metropolitan Area Networks, P802.1DP/Draft 1.0, Jul. 10, 2023, 70 pages.

*Primary Examiner* — Berhanu Shitayewoldetsadik
(74) *Attorney, Agent, or Firm* — Slater Matsil, LLP

(57) ABSTRACT

An embodiment system includes a digital switching fabric system forming a digital backbone network, and one or more first system components including first computer program code that causes the respective first system component to perform communication of data with one or more second system components over a virtual link through the digital backbone network. Communication of data is performed using a standardized serialization protocol and according to a transport mechanism. The respective first system component implements an end point infrastructure services (EPIS) stack providing endpoint data distribution services. The digital backbone network provides network connectivity the first system components and the one or more second system components according by limiting the communication to connectionless communication using transport mechanisms associated with the first system components. Each of the transport mechanisms is one of a time aware transport service, rate constrained transport service, or best effort transport service.

20 Claims, 8 Drawing Sheets

(56) References Cited

U.S. PATENT DOCUMENTS

2013/0073764 A1* 3/2013 Deb ........................ H04L 12/66
710/241
2019/0109872 A1* 4/2019 Dhakshinamoorthy .....................
G06F 21/577
2020/0259896 A1* 8/2020 Sachs .................. H04L 63/0428
2020/0389469 A1* 12/2020 Litichever ............. H04W 12/12
2022/0224776 A1* 7/2022 Doshi ................. G06F 12/0897
2022/0345417 A1* 10/2022 Kasichainula .......... H04L 47/30
2023/0231909 A1* 7/2023 Moon ................... G06F 21/606
709/203
2023/0367833 A1* 11/2023 Kol ....................... G06F 16/958
2024/0273158 A1* 8/2024 Kol ..................... G06F 16/9566

* cited by examiner

DATA TYPE SEPARATION FOR AIRCRAFT MISSION SYSTEMS DIGITAL BACKBONE

STATEMENT ON UNITED STATES GOVERNMENT RIGHTS

This invention was made with U.S. Government support under Agreement No. W31P4Q-18-D-0002 awarded by the Army Contracting Command-Redstone Arsenal. The Government has certain rights in the invention.

TECHNICAL FIELD

The present invention relates generally to a system and method for providing in-vehicle communications network systems, and, in particular embodiments, to a system and method for providing a network with a unified flight certifiable network for an aircraft with vehicle system data sequestered from mission system data.

BACKGROUND

Generally, as vehicles, and aircraft in particular, have become more complex, the need for data transmission within the aircraft as increased. This data transmission may include transmission of vehicle system data between flight control computer (FCCs), engine control computers (ECCs), flight instruments and sensors, control system, and the like. The increased complexity of vehicles has included the addition of mission system data that is less critical to the stability and operation of the vehicle itself. For example, vehicle system data such as commands to flight control surfaces commands or engine commands are more critical to the flight of an aircraft, mission systems such as communications data, weapons control systems commands, lighting control commands, and the like, may be less critical to the basic airworthiness of an aircraft.

In order to ensure that more critical vehicle system data is delivered in a guaranteed manner, vehicle system data may be transmitted on a network separate from a network for mission system data. However, this introduces multiple failure points while requiring significantly more hardware than a single network.

SUMMARY

An embodiment system includes a digital switching fabric system forming a digital backbone network, and one or more first system components, each first system component connected to the digital backbone network and including one or more first processors and at least one first non-transitory computer readable memory connected to the one or more first processors and including first computer program code. The at least one first non-transitory computer readable memory and the first computer program code are configured, with the one or more first processors, to cause the respective first system component to at least perform communication of data with one or more second system components over a virtual link through the digital backbone network, where the communication of the data is performed using a standardized serialization protocol and according to a transport mechanism, where the transport mechanism is predetermined according to a source of the data, where the respective first system component being caused to perform the communication of the data includes the respective first system component being caused to perform at least implementing an end point infrastructure services (EPIS) stack, where the EPIS stack provides endpoint data distribution services through a structured typed application interface associated with a common data model and the digital backbone network, where the structured typed application interface implements at least one of a publisher structured typed application interface or a subscriber structured typed application interface, and where the digital backbone network is configured to provide network connectivity for communication between the one or more first system components and the one or more second system components according to one or more configuration files and by limiting the communication to connectionless communication using transport mechanisms associated with the one or more first system components, and where each of the transport mechanisms is one of a time aware transport service, rate constrained transport service, or best effort transport service.

An embodiments system includes one or more first system components, including one or more first processors, and at least one first non-transitory computer readable memory connected to the one or more first processors and including first computer program code. The at least one first non-transitory computer readable memory and the first computer program code are configured, with the one or more first processors, to cause the respective first system component to at least implement a first end point infrastructure services (EPIS) stack, where the first EPIS stack provides endpoint data distribution services through a structured typed application interface associated with a common data model, where the structured typed application interface implements a publisher structured typed application interface, and where the first EPIS stack is configured to provide an interface, via the publisher structured typed application interface, between a data source and a digital switching fabric system forming a digital backbone network, and perform communication of data with one or more second system components over a virtual link through the digital backbone network, where the communication of the data is performed using a standardized serialization protocol and according to a transport mechanism, where the transport mechanism is predetermined according to a source of the data and is one of a time aware transport service, a rate constrained transport service, or a best effort transport service, where performing communication of the data includes acting as a publisher of the data, where acting as the publisher includes sending the data over the virtual link to the one or more second system components through the first EPIS stack and through the digital backbone network. The system further includes one or more second system components, including one or more second processors, and at least one second non-transitory computer readable memory connected to the one or more second processors and including second computer program code. The at least one second non-transitory computer readable memory and the second computer program code are configured, with the one or more second processors, to cause the respective second system component to at least implement a second EPIS stack, where the second EPIS stack provides endpoint data distribution services through a structured typed application interface associated with the common data model, where the structured typed application interface implements at least a subscriber structured typed application interface, and where the second EPIS stack is configured to provide an interface, via the subscriber structured typed application interface, between the digital switching fabric system and a data target, and act as a subscriber in communication of the data with one or more first system components over the virtual link vie the second EPIS stack.

An embodiment method includes implementing, by a first system component connected to a digital backbone network of an aircraft, a first end point infrastructure services (EPIS) stack that provides endpoint data distribution services through a structured typed application interface associated with a common data model, where the structured typed application interface implements a publisher structured typed application interface, providing, by the first EPIS stack, an interface, via the publisher structured typed application interface, between a data source and a digital switching fabric system forming a digital backbone network, and performing communication of data, via a data stream generated by the first system component, with a second system component over a virtual link through the digital backbone network, where the communication of the data is performed using a standardized serialization protocol and according to a transport mechanism, where the transport mechanism is associated with the data stream and is predetermined according to a source of the data and is one of a time aware transport service, rate constrained transport service, or best effort transport service, where performing communication of the data includes acting as a publisher of the data, where acting as the publisher includes sending the data on the data stream over the virtual link to the second system component through the first EPIS stack and through the digital backbone network, implementing, by the second system component, a second EPIS stack, where the second EPIS stack provides endpoint data distribution services through a structured typed application interface associated with the common data model, where the structured typed application interface implements at least a subscriber structured typed application interface, and where the second EPIS stack is configured to provide an interface, via the subscriber structured typed application interface, between the digital switching fabric system and a data target, and acting, by the second system component, as a subscriber in communication of the data by receiving, via the second EPIS stack, the data stream from the first system component over the virtual link.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In order to avoid the excess hardware and complexity inherent in multiple networks in a vehicle, the presented principles are directed to providing a unified network that handles both vehicle systems data and mission system data. An Open Systems Architecture (OSA) for the unified network provides a digital backbone for the network and may implement modular design, standards-based interfaces, and widely supported consensus-based standards. The network provides abstraction of the application layer of the communications stack from the transport layer, allowing for standards based data transport or transmission according to specified data priority. This provides the ability to protect priority traffic on a single wire from being overloaded by other, lower priority traffic.

On aircraft, each avionics module historically had a separate box and isolated hardware. However, ARINC 653 operating systems (OSes) permit offloading of processing, and avoid federation at the system level. ARINC 653 is a standard that describing how a multicore processor can provide processing using shared resources on a single chip. The presented principles are directed to providing shared resources on a network, while maintaining data sequestration and security. The use of a digital backbone fabric provides an overall platform with multiple systems without needing a dedicated bus on a vehicle or structure chassis. Integrated module avionics (IMA) provide for a virtual backplane that uses software defined buses on shared links and that may be extended to a platform and provide deterministic connectivity fabric to connect partitions, system, elements, components, and the like. Software components are connected by the virtual backplane, which provide deterministic and segregated connectivity between software components. A time sensitive network (TSN) allows extension of processing across separate hardware elements by providing appropriate network connectivity, reliability and data sequestration, when used with the proposed digital backbone.

Transmission according to data priority may use different transport priorities, including time aware transport, rate constrained transport, and best effort transport. Additionally, transmissions within each type of transport priority may be prioritized, with time aware elements having assigned slots, and with rate constrained elements having different priorities and best effort elements having different priorities. With the network being limited to a fixed network, the requirement for on-the-fly or ad-hoc network changes are eliminated, and communications at different priority levels may be scheduled using configuration files for each software application, hardware device, network element, or the like.

Figure 1:
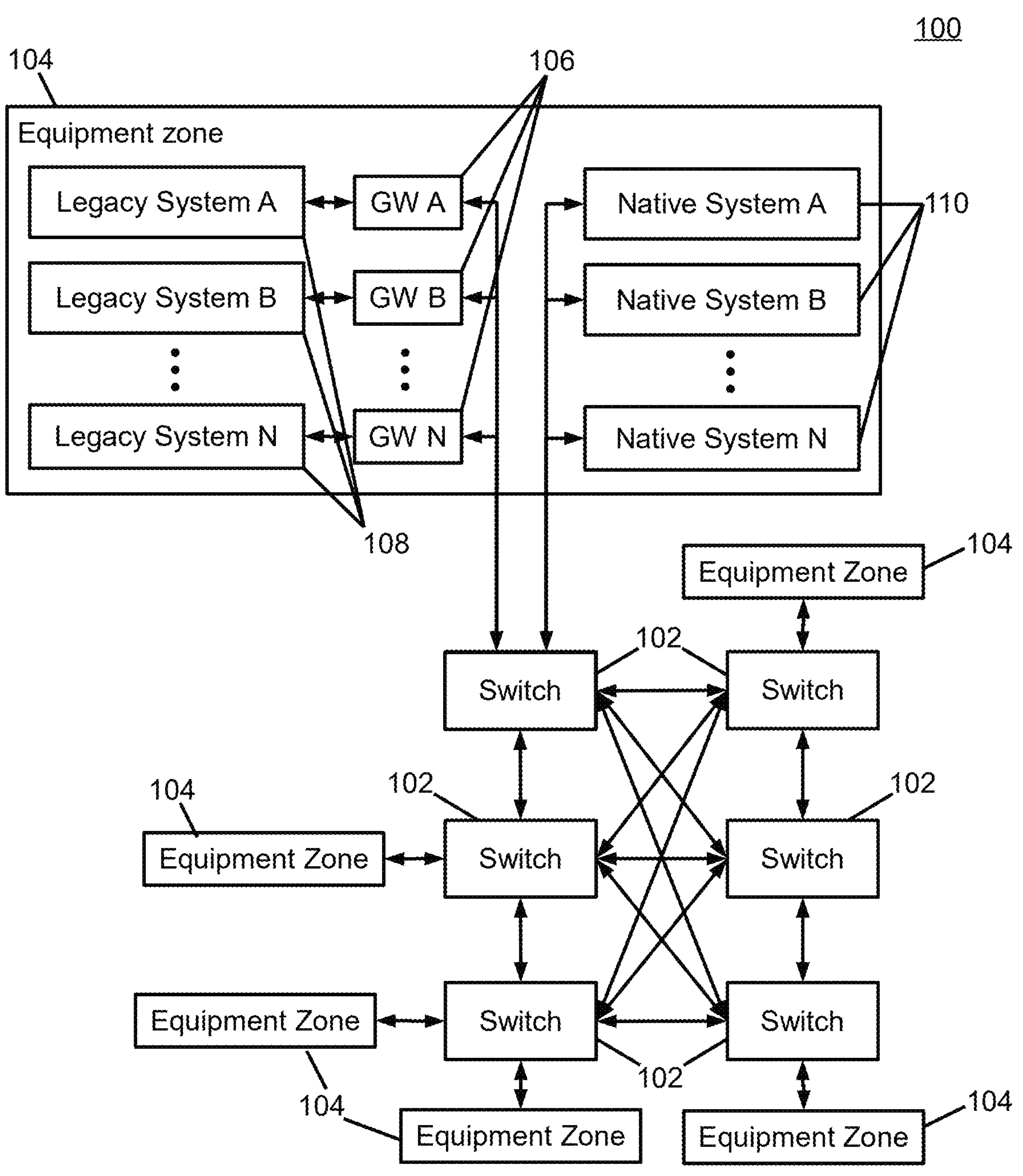
FIG. 1 is a logical diagram illustrating a digital backbone network according to some embodiments.

FIG. 1 is a logical diagram illustrating a digital backbone network 100 according to some embodiments. The network may have one or more switches 102. In some embodiments, the switches 102 are connected by a high-speed virtual backplane, eliminating point-to-point connections and forming an interconnected distributed compute environment. The virtual backplane may be implemented by a time sensitive network (TSN) deterministic ethernet switched network that is certifiable to Design Assurance Level A (DAL-A), with 200 Gbps switching capacity per switch and up 10 Gbps per switch port. The network 100 enables virtual links between switches 102 and other compute modules or network elements. Traffic for software applications may be portioned or separated according to safety and cyber security considerations while making data broadly available for use across the network. Eliminating point-to-point connections and enabling virtual links between applications of varying safety and security levels, avoids significant weight associated with multiple separate networks and increases maintainability and availability through reduced cabling requirements.

In some embodiments, a virtual link is a logical path from one source end system to one or more destination end systems. The logical path is made up of the networking forwarding rules, schedules, and memory resources used to fully propagate TSN frames from source to destination. The redundant network implements frame replication, mitigating single point failures of the network and maintaining the network functionality. The isolation of TSN virtual links is done by the TSN networking hardware which applies strict scheduling algorithms to incoming data. Thus, if one application utilizing a virtual link does not maintain its schedule, the networking hardware ensures that it cannot interfere with any other virtual link.

In some embodiments, the network 100 may also have hardware modularity achieved through application of Hardware Open Systems Technologies (HOST) architecture. This systems architecture allows the system to be upgraded and adapted to for different system requirements. For example, separate systems such as Mission and Vehicle Management Systems equipment have modules that are HOST conformant to provide a system of standardized modules interfacing with a standardized backplane. The computing platforms comprise HOST-conformant compute modules, power supply, and Ethernet switch modules for communication with the Digital Backbone. Switches 102 or switch modules are also HOST conformant. These switches 102 act as the interface between network gateways (GWs) 106, such as exchange points (NXPs) and the Digital Backbone.

When replacing a hardware component, avionics system integration software may be impacted. With decoupling and abstractions of interfaces it is increasingly possible to implement a hardware change without impacting software. The HOST conformant system elements allow for card modularity, reconfigurability, and replacement. Additionally, standalone line replaceable units (LRUs) integrated in the system conform to common modeled interfaces and data exchanges. This enables a modular type of architecture where hardware modules are more easily replaced if the data model is fulfilled by the new hardware.

The switches 102 form the digital backbone and connect one or more equipment zones 104 to each other. The equipment zones 104 have one or more network elements that may be native systems 110 or legacy systems 108. Native systems 110 communicate natively with the switches without requiring modification to data transmissions with the switches, and implement communications protocols used by the switches. Legacy systems 108 use a data format of communications protocol that is different that, or incompatible with that used by the switches 102. The legacy systems 108 may be connected to one or more switches 102 by the GWs 106. The GWs 106 may provide gateway functions, acting as connection points and translators for legacy systems 108 by providing backward compatibility for currently fielded equipment. In some embodiments, the GWs 106 provide an interface between the legacy modules 108 and switches 102 via a standard Ethernet connection.

In the network 100, data interfaces are connections between subsystems or components where data is exchanged. Each data interface is using interface blocks and ports. In some embodiments, data interfaces for network components are developed in accordance with consensus-based open standards to ensure that modularity and severability of such architecture components is maintained to allow for future updates or replacement.

For data distribution implemented by the network 100, a network integration model (NIM) may be used to define and manage component interfaces for the network 100 and digital backbone. Thus, since the network 100 is a fixed architecture, data integration modeling for all components accessing the Digital Backbone, all network configuration attributes necessary for Digital Backbone network configuration file generation, and legacy data representation plus equivalences for gateway data translation file generation purposes may be defined before the network is constructed. The definition of network interfaces enables the enforcement of proper configuration management to correctly and safely enable auto-generation of the network configuration files and validation artifacts. Network integration modelling may include topic definitions, quality of service (QoS) assignments and parameters, system network resource limitations, Internet Protocol (IP) and port assignments, software application connectivity, security classification, safety criticality classification, mission criticality classification, Air Vehicle/Mission System Architecture (AV/MSA) domain classification, or the like.

In some embodiments, the GWs 106 provide gateway functionality through translation of communications to and from the associated legacy systems 108 using software and network adapters such as Future Airborne Capability Environment® (FACE) wrappers, hardware connection interfaces, and the like. The GWs 106 reside on the edge of the network 100 to provide a translation function allowing non-native equipment to participate on the network 100. The GWs 106 provide a gateway function by providing network translation through a high-speed, low-latency support for applications with low-latency communication requirements.

In some embodiments, data representation for the data interfaces is developed in accordance with the Future Airborne Capability Environment® (FACE™) Technical Standard. The data representation integrates the data and needs of all applicable components within system. Additionally, the data representation is supplemented by standards-based data representation and associated rationale for non-adherence to the FACE™ Technical Standard for the remaining components.

In some embodiments, Ethernet is used as the physical layer standard for data interfaces, with multiple TSN standards adopted at the data link layer to develop an open, deterministic, network, with TSN standards selected from, for example, IEEE TSN developed standards, or other TSN network standards that provide for implementation of a deterministic network.

At higher levels, data distribution service (DDS) and standardized serialization protocol services act as middleware to deliver a data centric, publish-subscribe, open network framework for data delivery. The standardized serialization service may provide communications between one or more publishers and one or more subscribers, so that messages may be effectively routed between network endpoints, and the messaging controlled to optimize network traffic. The standardized serialization protocol may be, in various embodiments, real-time publish-subscribe (RTPS) services, Google® protocol buffers (Protobuf), Concise Binary Object Representation (CBOR), or the like. DDS/RTPS, for example, utilizes a multicast user datagram protocol (UDP) at network and transport layers. Since the network is, in some embodiments, a deterministic and fixed network using predetermined configurations, certain parts of DDS, including the discovery mechanism, may be omitted to maintain the deterministic network and for airworthiness certification considerations. However, DDS middleware permits decoupling of applications from their tightly woven interfaces, and results in to a data centric networking model that facilitates the insertion of alternative or reusable modular system elements. The DDS middleware may use the standardized serialization, such as a publish subscribe system, with data defined as topics. A topic represents the unit of information that can be produced or consumed by a software application with data objects that contain a group of different data values of various types. These topics are uniquely defined by a name, a type, and a set of QoS policies, with such information being contained in the NIM.

In some embodiments, data from the NIM may be used to automatically generate configuration files that define the transport priority levels for communications or topics, and may also define security parameters, destinations, resource allocations, and the like, for each transmission or application on a network, so that the resources may be tightly scheduled to efficiently use resources while minimizing the required network complexity and cost. In in some embodiments, data from the NIM is exported in extensible markup language (XML) files for processing and translation to generate configuration files for the network 100 hardware. In some embodiments, a centralized network configuration (CNC) tool handles configuration generation, and may be responsible for generating the various configuration files for the TSN hardware based on settings defined in the NIM model. For example, the CNC may verify the network is schedulable and bandwidth is available for all data flows defined in the NIM model. Validation may be done by analyzing every data flow within the model, the network topology, and the TSN hardware resource limitations to determine if the network described has a schedulable, deterministic solution. If a solution for scheduling modelled data is not determinable for a particular model or data set, the CNC may determine schedule constraints and/or bandwidth limitations, may reduce the rate or size of the data at the software domain level, determine alternate paths for the data, reducing QoS parameters, or optimizing other parts of the network to accommodate or generate a new or modified data flow.

In some embodiments, the configuration files generated by the CNC include routing tables/schedule for switches 102, and the TSN schedule for any TSN end point infrastructure services (EPIS) components. The configuration files may be Yet Another Next Generation (YANG) XML files that are IEEE 802.1 standard complaint. GWs 106 may be provided with gateway translation configuration files generated by a translator configuration tool, and may be used to translate data from legacy systems 108 into a more standard format usable on the network 100. The use of the NIM enables auto-generation of network configuration files, maximizing the ability of the system to accommodate the insertion of alternative (or new) hardware and software.

In some embodiments, air vehicle and mission system domain isolation on the network 100 is accommodated by the tagging of data flows using the configuration files. Isolating safety-critical flows for the air vehicle domain from non-safety flows is performed through switch forwarding rules and constraints applied by the CNC tool. These rules force mutual exclusivity between vehicle system and mission system mutual exclusivity a network switch providing the required data isolation.

The NIM provides standards-based attribute definitions, so that configuration tooling can be developed by accessing the profiles and open standards. Furthermore, components that perform data translation and network management can also be produced by prescribing functions to perform network configuration and data translation. The resulting NIM is, therefore, agnostic to tool, hardware and software implementation while providing proper configuration management and validation opportunities for rapid configurability.

The configuration file system also permits modifications to network flows for switches 102 and GWs 106 by providing new or updated configuration files. With sufficient electrical and thermal margins, data distribution can be predeployed for a selected set of predefined kits without reconfiguration. The CNC tool may be used to create new configurations or may be replaced, modified or updated, as the CNC tool functional and interface definitions are provided.

The network 100 further provides for implementation of legacy systems 108. The GWs 106 adapt existing non-TSN interfaces for non-developmental hardware and non-TSN hardware to normalized data flows. Migrating proprietary, vendor-unique, or closed system equipment to work with the network 100 requires adopting the underlying TSN and DDS interface standards or utilizing the GWs 106. Adopting the TSN and DDS standards may involve hardware and software upgrades to the existing equipment to make that equipment a native system 110. After adopting the NIM model architecture and using the TSN and DDS standards, the equipment is capable of interfacing with any other equipment on the network 100 that requires its data. If the use of a gateway, such as an exchange point, is required, the legacy data interfaces of the equipment are modeled in the NIM, which generates the appropriate translation configuration files for the GW 106.

Reconfiguring the data distribution system is necessary when new equipment is integrated into the system. Interface data and characteristics of any new equipment are added to the NIM and given QoS designations and transmissions priority for TSN and DDS, and may have dedicated transmission resources scheduled for transmissions by the new equipment. If an NXP is required for the integration of the new equipment, a translation mapping is also added to the NIM, and a configuration toolset is utilized to auto-generate gateway configuration data as, for example, ARINC 665-5 loadable software parts, for installation in a relevant GW 106. Integrating new equipment onto the digital backbone or network without the use of a gateway requires that the new equipment meet the interface standards for the network. Thus, the equipment must support TSN and DDS to allow for compatibility and integration via the network 100 and switches 102.

Each equipment zone 104 may have only native systems 110, only legacy systems 108 and associated GWs 106, or a combination of native systems 110 and legacy system 108/GW 106 arrangements. The equipment zones 104 may be bays, closets, regions, areas, containers, enclosures, or other collection areas for the native systems 108 and legacy systems 110, and use common connection buses, wiring or other shared resources for communicating with the switches 102.

In some embodiments, the switches 102 also provide common services for use by the native systems 110 or legacy systems 108. Common services are a set of low-level functions extended to applications across the network, and promote commonality and abstraction simplifying development, integration and testing. The common service also reduces upgrade and maintenance costs. In some embodiments, common services may include, for example, data loading, logging or storage services, encryption, decryption or key management services, security event audit, monitoring or protection services, user authentication services, or any other services.

Figure 2:
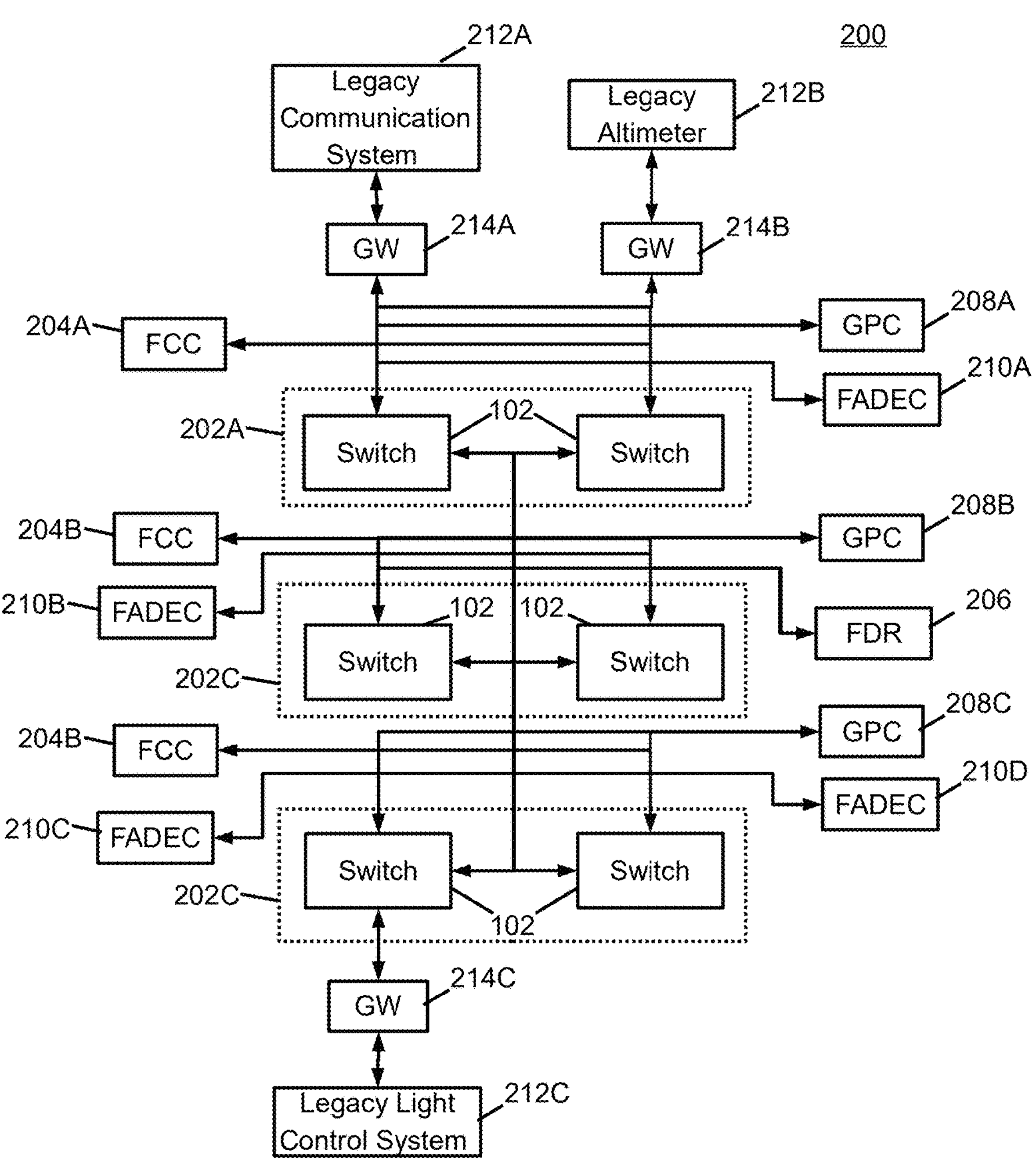
FIG. 2 is a diagram illustrating a digital backbone network according to some embodiments.

FIG. 2 is a diagram illustrating a digital backbone network 200 according to some embodiments. In some embodiments, the network 200 may have switches 102 arranged in switch pairs 202A . . . 202C or switch groups to provide redundancy. The network 200 may include network elements such as FCCs 204A . . . 204C, fully autonomous digital engine controllers 210A . . . 210C (FADECs), general purpose computers 208A . . . 208C (GPCs), a flight data recorder 206 (FDR), and legacy systems 212A . . . 212C such as a legacy communications system 212A, a legacy altimeter 212B, a legacy light control system 212C, and the like. The network 200 may also include one or more GWs 214A . . . 214C connecting respective legacy systems 212A . . . 212C to one or more switches 102.

Each network element may connect to multiple switches 102 so that failure or loss of one switch 102 in a switch pair 202A . . . 202C or group does not result in the connected network element being disconnected. In some embodiments, the network 100 may include three switch pairs 202A . . . 202C, with each switch 102 in a switch pair 202A . . . 202C remote from other switches 102 in the switch pair 202A . . . 202C. Thus, damage to a vehicle at a location of the first switch 102 in a switch pair 202A . . . 202C potentially avoids damage to the other switch 102 in the switch pair 202A . . . 202C. Additionally, multiple network elements may be connected to different switch pairs 202A . . . 202C to provide redundancy at the network element and switch 102 levels. For example, the network 200 may have multiple FCCs 204A . . . 204C, with a first FCC 204A connected to each switch 202 in a first switch pair 202A, a second FCC 204B connected to each switch 102 in a second switch pair 202B, and a third FCC 24C connected to each switch in a third switch pair 202C. Additionally, in other embodiments, other FCCs may be implemented, and each FCC 204A . . . 204C may be connected to additional switches 102.

In some embodiments the GPCs 208A . . . 208C are each heterogenous, distributed general purpose compute environments that implement the ARINC 653 operating system specification which incorporates partitions for separating critical and non-critical functions running on the GPCs 208A . . . 208C.

In some embodiments, the switches 102 may be connected to each other by high speed networking, while native systems, such as the FCCs 204A . . . 204C, GPCs 208A . . . 208C, FADECs 210A . . . 210D, FDR 206 or the like, and the legacy systems, such as the GWs 214A . . . 214C, and connected legacy systems 212A . . . 212C connect to one or more switches by lower speed networking. In some embodiments, the high speed networking may be 2.5GBaseT networking operating at 2.5 Gigabit/s, while the lower speed networking may be 1GBaseT networking operating at 1 Gigabit/s. The lower speed networking may be used to reduce costs and weight for systems that do not need higher bandwidth, while the high speed networking may be used to handle high traffic links between switches. Since the switches 102 could theoretically move all data on switch-to-switch links, higher throughput would likely be necessary compared to links between the switches 102 and other network elements since the other network elements would likely only require bandwidth for immediately connected network elements, rather than all network elements. In other embodiments, the networking between switches, and the networking between the switches and other network elements cold be any type of networking, and may be adjusted or modified from the embodiments described herein based on network and data requirements.

Figure 3A:
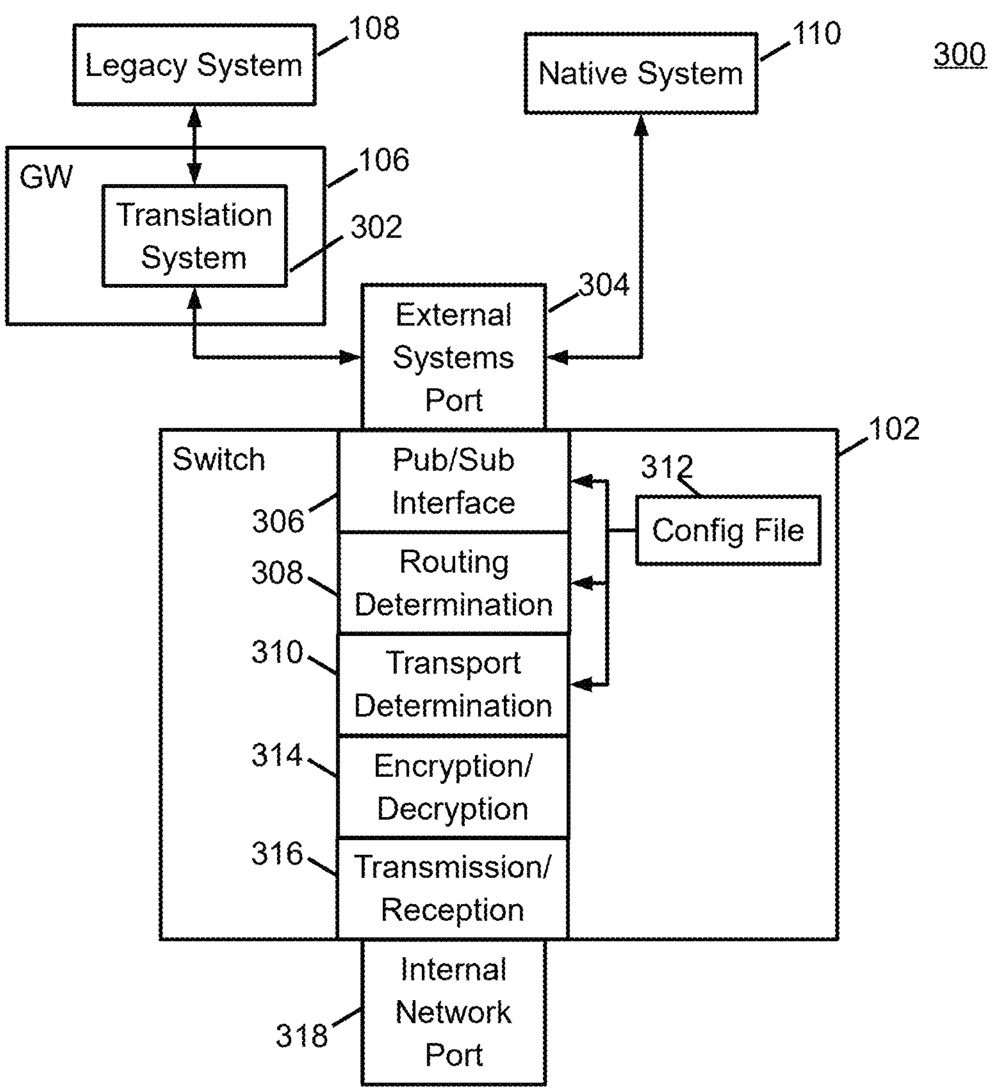
FIG. 3A is a logical diagram illustrating an arrangement of a switch and network elements of a digital backbone network according to some embodiments.

FIG. 3A is a logical diagram illustrating an arrangement 300 of a switch 102 and network elements 106, 108, 110 of a digital backbone network according to some embodiments. In some embodiments, a legacy system communicates with a switch 102 through a GW 106 having a translation system 302. The translation system 302 converts, or translates legacy data from the legacy data format into a format compatible with an interface of the TSN switch 102. In some embodiments, the GW 106 utilizes a common data model associated with the digital backbone network and implements an EPIS stack, and uses a gateway configuration file to determine how the translation system 302 implements translation from the legacy system format to a TSN format. The EPIS stack may provide endpoint data distribution services through publisher and subscriber structured typed application interfaces associated with the common data model and the digital backbone network.

In some embodiments, a native system 110 communicates with the TSN switch natively, or using the data format compatible with the interface of the TSN. In some embodiments, the native system 110 is configured to generate native data or data that uses the standard TSN data models and transmission format. The native system 110 sends the native data to the TSN switch 102 in the compatible data format. In some embodiments, the native system 110 utilizes the common data model and implements the EPIS stack and publisher and subscriber structures typed application interfaces.

The GW 106 and native system 110 may be connected to an external systems port 304 of the switch 102. The external systems port 304 may be a network port that receives networked or bus data from the network elements 106, 108, 110, and may receive different types of data. For example, different systems may send different priority data through the external systems port 304. Thus, in some embodiments, vehicle systems communications that require a time aware transport system may be received by a TSN switch 102 through a same external system port 304 that mission systems communications that use rate or bandwidth limited communications or best effort communications.

The external systems port 304 receives data from external systems, and provides the data to internal elements of the switch for processing and routing. In some embodiments, the switch 102 may have a publisher subscriber element 306 that enforces connectionless communications. Thus, while a TSN network may be able to use connection based communication, a deterministic network such as the digital backbone network requires that the TSN network use connectionless communication to ensure that the digital backbone network is a deterministic network that guarantees in-time or on-time data delivery at the end points, regardless of the intermediate infrastructure. Thus, the publisher subscriber element 306 may limit incoming and outgoing communications to one way communications so that a connection is not maintained, and responses to messages are not expected over a maintained connection. Additionally, in some embodiments, the TSN switches 102 may have one or more configuration files 312. Each configuration file 312 may be associated with one or more network elements 106, 108, 110. The configuration file 312 may be used by the publisher subscriber element 306 to validate the publisher or subscriber status of a network element 106, 108, 110, with the publisher subscriber element 306 that are not connectionless communications, or not permitted as part of a publisher or subscriber messaging pattern or communication.

In some embodiments, the TSN switch 102 may have a routing determination element 308 that determines, from the identity of a data stream or communication, received through the external systems port 304, a destination to which data from the data stream will be routed. The routing determination element 308 may use data from the configuration file 312 to identify a predefined publisher-subscriber pattern or arrangement, and may use that arrangement data to determine the intended destination of the data stream based on the source, or publisher of the data stream data. Thus, communications may be specifically transmitted to a destination, rather than broadcast. In some embodiments, the routing determination element 308 may limit communication between a publisher and subscriber based on the configuration file 312 to ensure data security, and limit resource usage. For example, for a system 108, 110 that sends data through the external systems port 304 may be identified by, or associated with, a configuration file 312, which may identify a source and destination for the system 108, 110, or an application running on a system 108, 110. The configuration file 312 may then be used to limit communication to transmission by systems 108, 110 or applications to destinations identified in the configuration file 312 as receivers of the transmissions by the identified system 108, 110 or application.

In some embodiments, the TSN switch 102 also has a transport determination element 310 that determines, according to the configuration file, which transport should be used for transmission of the data stream data. The transport determination element 310 may also determine a frame slot or bandwidth identified for the data stream, and may, in some embodiments, may also determine scheduling or resources available for a particular transmission, or for transmissions by a particular system 108, 110 or application. In some embodiments, the switch 102 has an encryption or decryption element 314 that encrypts or decrypts data to ensure that data remains segregated from other data stream. The switch 102 may also have a transmission or reception element 316 that sets up a virtual link for the data stream data and that uses the assigned network resources for communication. The switch 102 may also have an internal network port 318 that handles the transport for sending or receiving data to or from other TSN switches 102. Each system component may include one or more processors and one or more computer readable medium storing computer code thereon. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

Each system component may have at least one processor and at least one memory, such as a non-transitory computer readable medium, and may include computer program code, that is configured to, with the at least one processor, provide the data processing and communication, including publication transmission or subscription listening. The memory may be a single component or it may be implemented as one or more separate components some or all of which may be integrated or removable and may provide permanent, semi-permanent, dynamic, or cached storage.

The one or more processors are configured to read from and write to the at least one memory. The processor may also comprise an output interface via which data or commands are output by the processor and an input interface via which data or commands are input to the processor. The memory stores a computer program including computer program instructions that control the operation of the engine monitoring, and possibly the overall system, when loaded into the processor. The computer program instructions provide the logic and routines that enable the apparatus to perform the data processing and communication and implement the digital backbone based communication systems. The processor, by reading the memory, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Figure 3B:
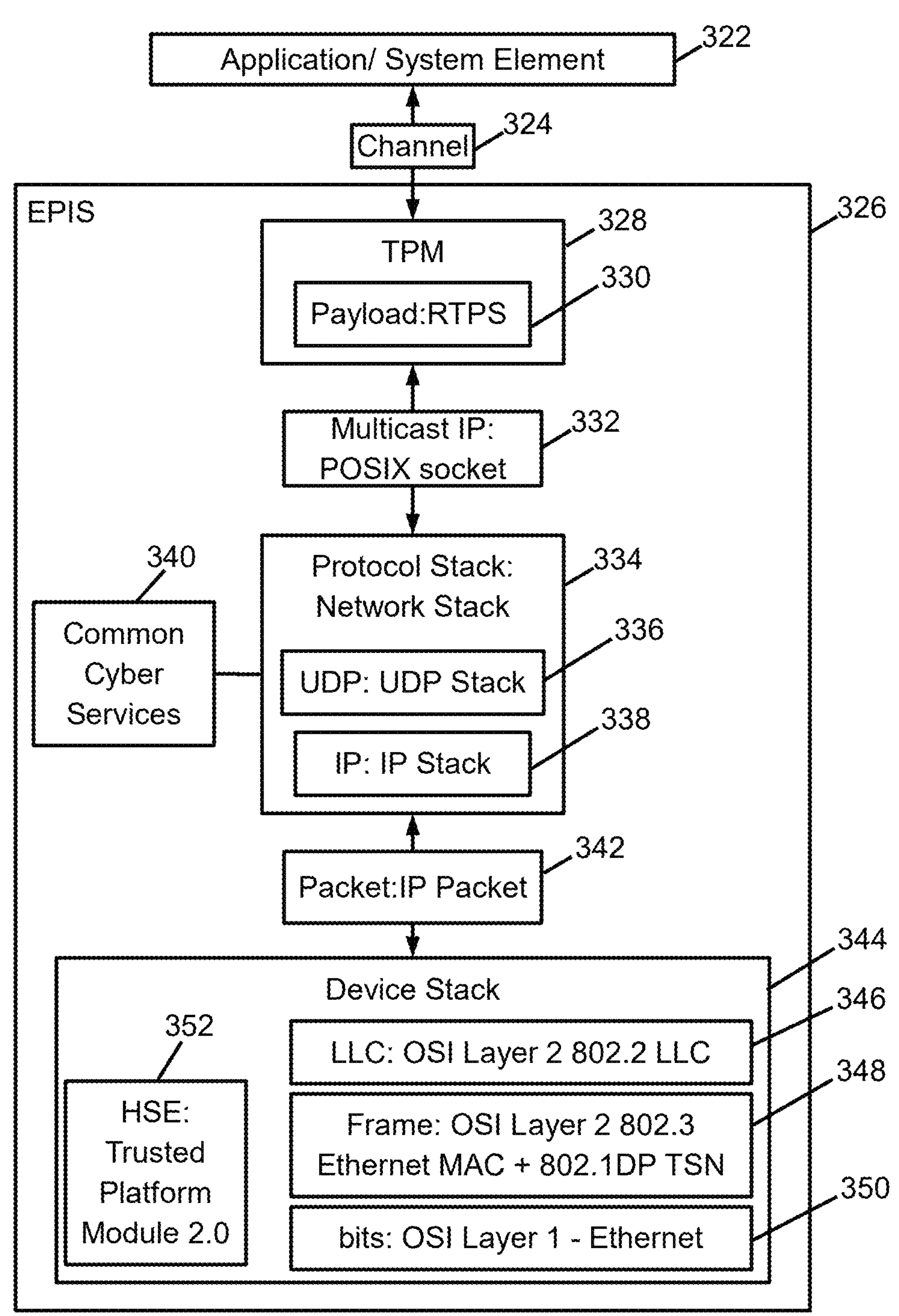
FIG. 3B is a logical diagram illustrating an end point infrastructure services (EPIS) system according to some embodiments.

FIG. 3B is a logical diagram illustrating an EPIS system 320 according to some embodiments. An EPIS 326 provides a TSN endpoint on a single piece of hardware, and can be assigned resources in a space/time domain to implement a portion of a software defined bus. Multiple EPIS 326 hardware sites may implement the software defined bus through switches forming the digital backbone network, with EPIS 326 chips at different components forming endpoints for virtual links. Using the IMA and ARINC 653 architecture enables separation of processing resources by providing segmentation of connectivity between boxes using the TSN. This avoids a need for all software components to be located on a single chip, as static provisioning is applied at a system level.

The EPIS 326 may include an EPIS stack with one or more stack elements, and provides endpoint data distribution services through a structured typed application interface. In some embodiments, the EPIS 326 includes a transport protocol module (TPM) 328 that provides an interface that an application 322 or other system element, such as a software service, hardware device, gateway, or the like, accesses the TPM 328 using a channel 324. In some embodiments, the TPM 328 may implement a Future Airborne Capability Environment® (FACE™) compliant system that communicates data with an application 322 running on a respective system component, or directly with a system component, gateway, service, or the like. In some embodiments, FACE uses a namedConnection interface, or TS interface, provided by a FACE Transport Services Segment (TSS) for data distribution. With the TS interface, the application 322 does not concern itself with any network transport induced constraints such as Maximum Transmission Unit (MTU). The TS interface deals with typed data and does not need to know how data appears on the wire.

The channel 324 is implemented by FACE TSS through a channel interface provided by the TPM 328. The channel interface introduces MTU constraints, which are reflected by constrained message specifications expressed as FACE templates, which may be translated to Interface Definition Language (IDL) corresponding to the serialization standard implemented in the TPM 328. The FACE TSS decomposes data structures that exceed MTU into the constrained data structures/message specification constrained by the channel interface requirements. The channel interface deals with typed data and does not need to know how data appears on the wire. In some embodiments, multiple namedConnection connections may map to a single channel, permitting multiple applications 322 to communicate over the channel 324, and permitting an application 322 to open multiple connections over the channel 324.

The TPM 328 may provide a standardized serialization service that prepares software objects for network transport in a platform specific manner. For example, in some embodiments, the standardized serialization method is Object Management Group® (OMG®) RTPS on-wire protocol, an open standard. However, the standardized serialization method may, in other embodiments, be another RTPS service, Google® protocol buffers (Protobuf), Concise Binary Object Representation (CBOR), or the like. The standardized serialization may be used to create virtual links between designated endpoints handles by the EPIS 326 systems. Thus, the TPM 328 may create one or more virtual links at an application or software level, with the TPM generating or handling serialized payloads, such as a TPMS payload 330, for each application communicating through the TPM 328.

In some embodiments, the EPIS 326 further comprises a protocol stack or network stack 334 that provides universal datagram protocol (UDP) services using a UDP stack 336, and internet protocol (IP) services using an IP stack 338. The protocol stack 334, may communicate, using a POSIX (Portable Operating System Interface) socket 332, through multicast IP, with the TPM 328. In some embodiments, the TPM 328 uses a multicast UDP socket for end-to-end network transport. Each multicast UDP socket maps to a TSN data stream aligned with a traffic class. The message (UDP payload) at this interface represents the serialized data representation of the type data at the channel interface. Additionally, multiple channels 324 may map to a single multicast UDP socket.

In some embodiments, the EPIS 326 further implements one or more Common Cyber Services 340. Native components such as the TPM 328 or network stack 334 may integrate the Common Cyber Services 340. In some embodiments, the Common Cyber Services 340 include one or more of a Key Management Service (KMS), User Authentication Service (UAS), Digital Signature Service (DSS), Encryption Decryption Service (EDS), or other services. It should be understood that the Common Cyber Services 340 are not limited to the explicitly listed services, as any common cyber service may be implemented by the EPIS 326.

The protocol stack or network stack 334 may further communicate via IP packets 342 for network transport over the digital backbone network. The EPIS 326 may further have a device stack 434 implemented by hardware, and with a Hardware Secure Element (HSE) 352 such as a trusted platform module 2.0. The HSE 352 may be a secure hardware device that stores secure data, such as encryption or authentication keys, permitting the device stack to perform encryption of decryption of communications.

IP packets 342 may be sent to the device stack for transmission over the digital backbone. A logical link layer (LLC) system 346 may handle the logical link layer at OSI layer 2, according to IEEE 802.2, while a frame system 348 may handle framing at a MAC layer of the OSI layer 2 according to IEEE 802.3 for Ethernet MAC and according to IEEE 802.1DP (TSN for Aerospace Onboard Ethernet Communications). There is no joining of groups, as resources are statically allocated and defined. Therefore, the discovery portion of any standards may be omitted to ensure that the system is deterministic, as discovery results in a non-deterministic system.

Figure 4:
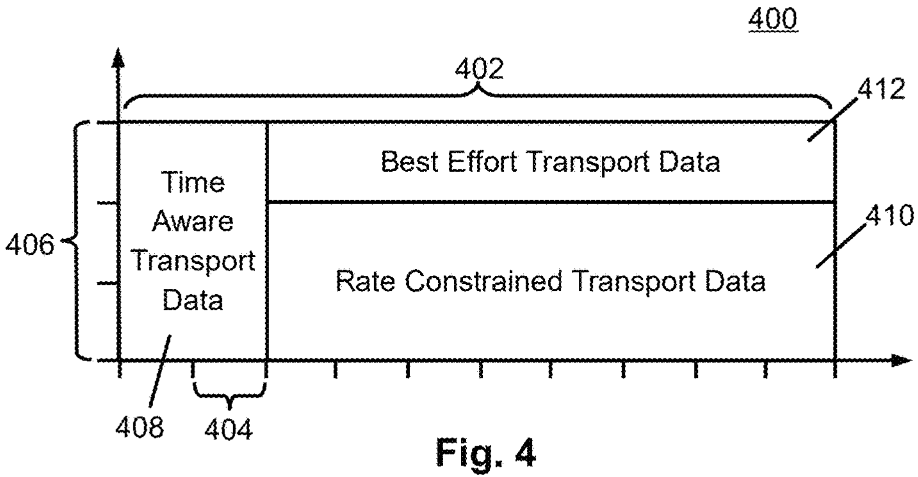
FIG. 4 is a diagram illustrating a transmission allocation for a frame of a digital backbone network according to some embodiments.

FIG. 4 is a diagram illustrating a transmission allocation 400 for a frame 402 of a digital backbone network according to some embodiments. A frame 402 may have one or more transmission time slots 404 that are time slots used for transmission of data. The different time slots may be allocated to different data streams, connections or virtual links, and each time slot has some bandwidth 406. The bandwidth is the maximum amount of data that a particular network connection can handle in a particular time slot 404. In some embodiments, each network element, or application running on a network element, may have a transmission priority, and may have transmission resources, such as transmission slots or bandwidth scheduled or assigned for the transmission. The assignment or scheduling of transmission and priority, where implemented, may be indicated by one or more configuration files Time aware transport data 408 is data this required to be transmitted with a transmission guarantee, and has the highest priority. The time aware transport data 408 can be any type of data, but vehicle system communication that is for safety critical functions over the digital backbone network is limited to the time aware transport, and thus has time aware transport data 408 assigned to the associated data streams. Time aware data may be assigned specific time aware frame time slots 404 so that availability of transmission resources is ensured. Additionally, each time aware data stream may have a priority so that assignment or use of resources may be prioritized among the time aware elements, if needed.

Rate constrained data 410, or bandwidth limited data may be data that requires a rate constrained transport service that is a latency bounded transport mechanism. Bandwidth limited transmission bandwidth is reserved for transmission of data in time slots other than the time aware transmission slots. The rate constrained data may be in rate constrained data streams, or provided by rate constrained elements, that are prioritized among the rate constrained data streams or elements, so that higher priority rate constrained data streams are transmitted before lower priority rate constrained data streams if the bandwidth or resources available for the rate constrained data streams or elements is insufficient for multiple rate constrained data streams to be sent at the same time or in desired frames or slots. Additionally, in some embodiments, the rate constrained transport service is a latency bounded transport mechanism using first-in-first-out (FIFO) transmission with priority queueing for bandwidth limited transmission bandwidth in time slots other than the time aware transmission slots. Best effort transport data is the lowest priority data, and is effectively the data remaining in a frame after the time aware data slots are allocated, and the rate constrained data transmission resources are allocated. Thus, a frame 402 may have some slots reserved for time aware transport data, and some remaining bandwidth in the other slots may be used for the rate constrained transport data as needed. Any remaining bandwidth in the non-time aware transport data slots may then be used for best effort transport data 412 as needed. In some embodiments, the best effort transport data 412 uses FIFO transmission with priority queueing for time slots other than the time aware transmission slots and time slots or bandwidth used by the bandwidth limited transmission. The best effort data may be in best effort data streams, or provided by best effort elements, that are prioritized among the best effort data streams or elements, so that higher priority best effort data streams are transmitted before lower priority best effort data streams if the bandwidth or resources available for the best effort data streams or elements is insufficient for multiple best effort data streams to be sent at the same time or in desired frames or slots.

Figure 5A:
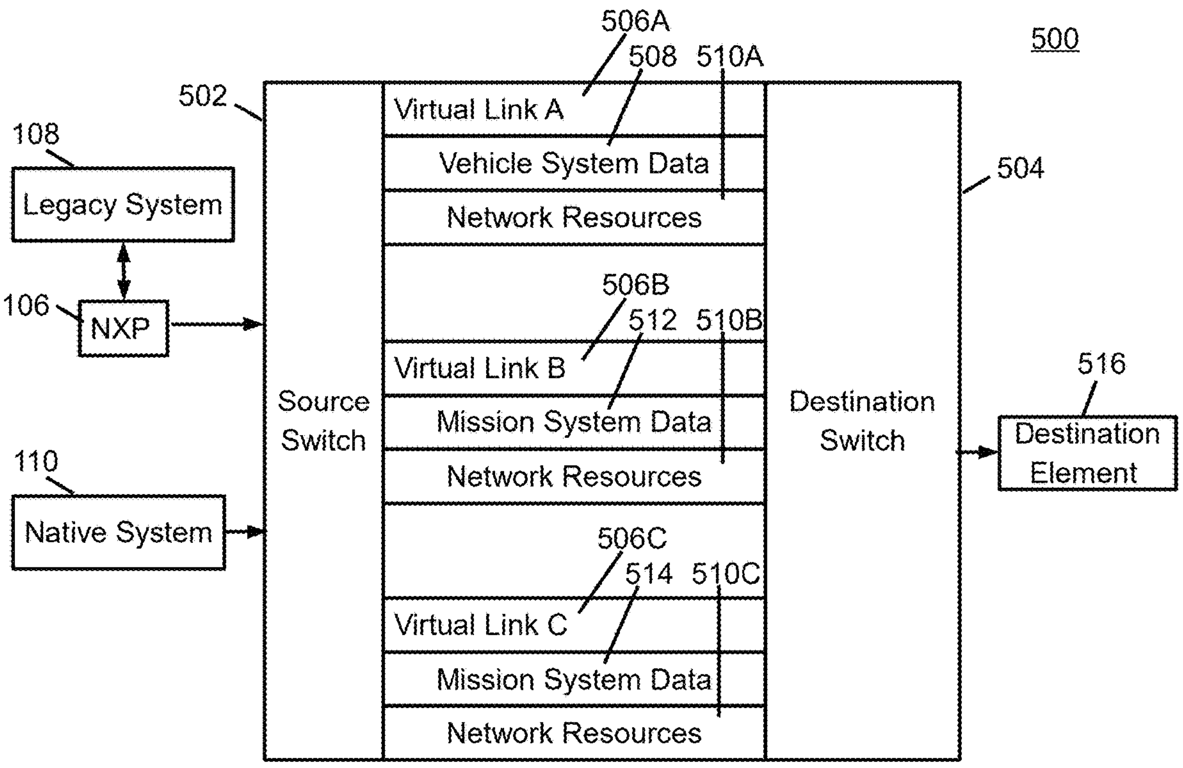
FIG. 5A is a logical diagram illustrating a transmission process using virtual links in a digital backbone network according to some embodiments.

FIG. 5A is a logical diagram illustrating a transmission process 500 using virtual links 506A . . . 506C in a digital backbone network according to some embodiments. In some embodiment, a source switch 502 receives data from a native system 110, or from a legacy system 108 through a GW 106. The source switch 502 determines a destination element 516, and routing to the destination element 516 through a destination switch 504 according to a configuration file. In some embodiments, the configuration file identifies the destination based on the source of transmissions, with each network element, system 108, 110, application, or the like having one of or more specific destinations identified as part of a publish-subscribe system.

The source switch 502 sets up virtual links 506A . . . 506C between the source switch 502 and the destination switch 504. The transport layer includes network resources 510A . . . 510C for each virtual link. The network resources 510A . . . 510C are dedicated for the virtual link, but are segregated from data on other virtual links 506A . . . 506C so that data may be transmitted from a network element at the application layer without needing to address or handle the transport layer. Additionally, segregating the network resources 510A . . . 510C for each virtual link 506A . . . 506C helps prevent malicious rerouting, access or interference with transmission over the virtual link from outside processes.

Each virtual link 506A . . . 506C is dedicated to a particular data stream or application, so that the virtual link 506A . . . 506C segregates different types of data. However, the different types of data may be transmitted from a shared port, over a shared physical network connection. For example, a first virtual link 506A may have vehicle system data 508 that is time aware data, and that may have assigned, guaranteed transmission resources. A second virtual link 506B may have mission system data 512 that is rate constrained data and transmission resources that are assigned, within a bandwidth limit, when needed. A third virtual link 506C may have mission system data 514 that is best effort data, that has transmission resources assigned based on their availability outside the transmission resource assigned to the time aware vehicle systems data 508, and after bandwidth and slots have been assigned as needed to for the rate constrained mission system data 512.

Figure 5B:
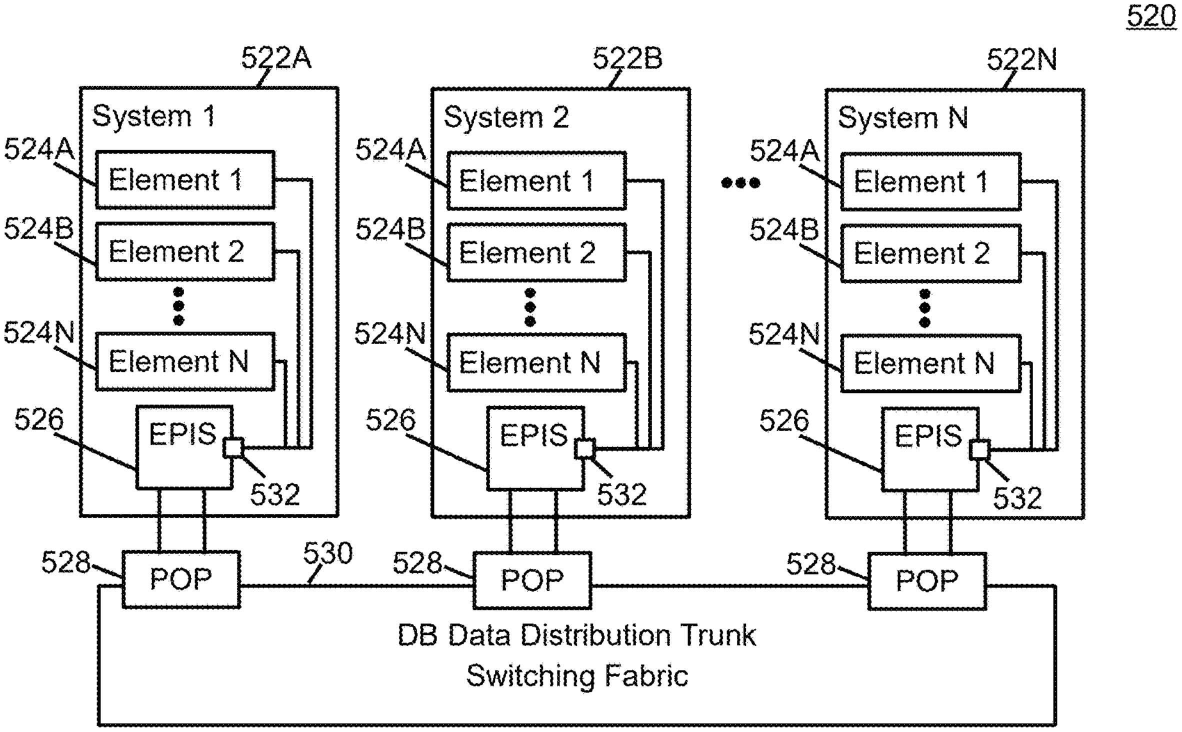
FIG. 5B is a logical diagram illustrating a digital backbone network system according to some embodiments.

FIG. 5B is a logical diagram illustrating a digital backbone network system 520 according to some embodiments. One or more systems 522A . . . 522N may be connected to the digital backbone data distribution trunk switching fabric 530 via a point-of-presence (POP). Each system 522A . . . 522N may provide, host, have, or otherwise include, one or more elements 524A . . . 524N that communicate over the switching fabric 530. Each system 522A . . . 522N may have one or more legacy system elements, one or more native system elements, or have a combination of elements 524A . . . 524N from native and legacy systems. Each element 524A . . . 524N may use one or more separate virtual links so that communications of each element 524A . . . 524N are segregated on the network, and may have distinct and separate destinations. Each element 524A . . . 524N of a particular system 522A . . . 522N may connect through a channel provided by an EPIS 526 of the host system 522A . . . 522N Thus, each system 522A . . . 522N may have elements that natively communicate with the EPIS 526 to transmit or receive data over the switching fabric, or may communicate through a gateway that translates legacy communication protocols into, or from, a format suitable for communication through the EPIS 526 to the switching fabric 530.

While each element 524A . . . 524N is shown as having a single link to the EPIS 526, each respective element 524A . . . 524N may create a virtual link with multiple connections, or connections on multiple virtual links, with each connection connecting to different parts of the switching fabric 530, and the respective switches of the switching fabric 530 connecting to one or more destinations. For example, in a redundant inertial data system, redundant embedded global positioning system (GPS)-aided inertial navigation systems (EGIs) may be disposed in separate systems 522A . . . 522N, and each EDI may have connections to multiple switches in the switching fabric 530. Multiple copies of data from the EGIs may be sent through different connections, such as RTPS connections, to destinations such as flight control computers (FCCs).

Figure 5C:
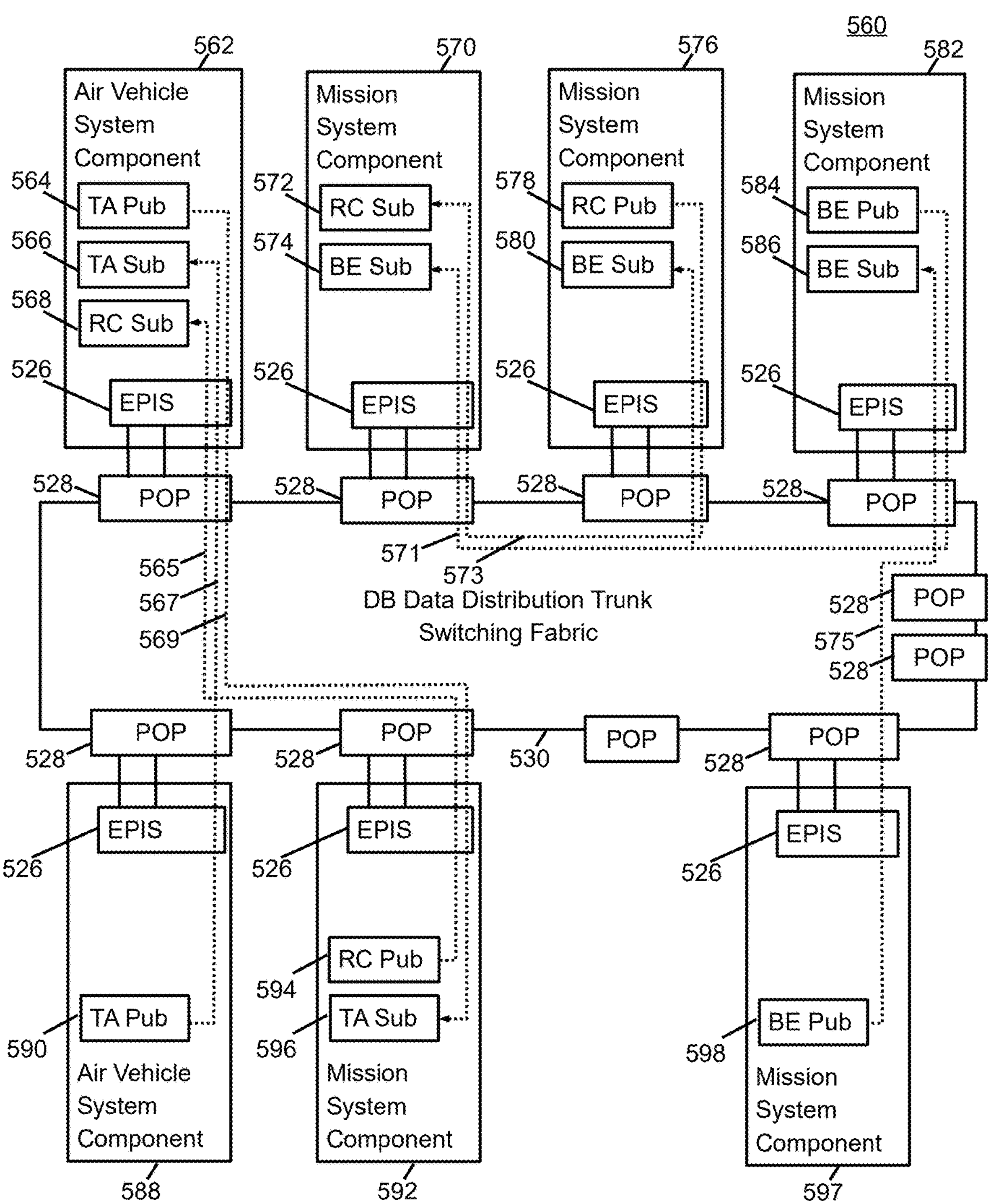
FIG. 5C is a logical diagram illustrating an arrangement of a digital backbone network system according to some embodiments.

FIG. 5C is a logical diagram illustrating an arrangement 560 of a digital backbone network system according to some embodiments. The digital backbone data distribution trunk switching fabric 530 is a switch collection, and the system may have a one or more hardware components connected to the switching fabric 530 through POPs 528. Each hardware component may be hardware such as an LRU allocated to air vehicle system or mission systems, depending on loaded software, and form integrated modular avionics components, some of which may be mission critical.

For example, the system may have one or more vehicle system components, including a first vehicle system component 562 and second vehicle system component 588. The system may further have one or more mission system components, including, for example, a first mission system component 570, second mission systems component 576, third mission system component 582, fourth mission system component 592, and fifth mission system component 592. Software elements may, in come embodiments, be components or elements that run on hardware components and that connect to each other via the switching fabric 530 of the virtual backplane.

Connections between software elements running on various system components define virtual links on a virtual or software defined bus to avoid other virtual links or busses disturbing the virtual backplane of the software defined bus. Thus, applications running in the same process can be segregated to restrict application communications from interfering with other application communications, and this segregation is extended across network, permitting certifiability of the network as flight safe.

For example, where the system uses publisher-subscriber standardized serialization, a virtual link is created between each publisher and each subscriber. Thus, a first time aware publisher (TA Pub) 564 may be a software element running on a first vehicle system component 562. The first TA Pub 564 may use a first virtual link 569 to send data to a second time aware subscriber (TA Sub) 596 in another component, such as the fourth mission system component 592. The first virtual link may connect the first TA Pub 564 to the second TA Sub 596 through the EPIS 526 of the first vehicle system component 562 and a relevant POP 528, through the switching fabric 530, through another POP 528 associated with the fourth mission system component 592, and through the EPIS 526 of the fourth mission system component 592. Resources in the switching fabric 530 are allocated according to the configuration files, which may identify the publishers or subscribers as being particular element that are associated with a particular transport type and with specifically allocated resources. In some embodiments, the switching fabric 530 enforces the resource allocation and segregation of virtual links, and in some embodiments, the EPISs 526 may further enforce or provide the resources and segregation for virtual links passing through the respective EPISs 526. Thus, the switching fabric 530 and EPISs 526 may provide network connectivity for communication between the system components according to one or more configuration files and by limiting the communication to connectionless communication using transport mechanisms associated with the one or more system components, or particular elements running on the components. Since the first TA Pub 564 is a time aware element, the first virtual link 569 is a time aware connection, and the EPIS 526 and switching fabric 530 allocate the identified resources to the first virtual link, and enforce the connectionless communication, limiting the first virtual link to connecting the first TA Pub 564 to the second TA Sub 596. The EPIS 5236 and switching fabric 530 further allocate resources, enforce connectionless communication, and limit other links based on the transport type of the respective connections, or virtual links.

Each component may have multiple elements, with different types of publisher or subscriber elements having different associated transport mechanisms. For example, a first time aware subscriber element (TA Sub) 566 and a first rate constrained subscriber element (RC Sub) 568 may both run on the first vehicle system component 562, and receive data sent through the switching fabric 530. Thus, the first TA Sub 566 may connect to, and receive data from, the second TA Pub 590 running on the second vehicle system component 588 by way of second virtual link 597. Similarly, the first rate constrained subscriber element (RC Sub) 568 may connect to, and receive data from, second rate constrained publisher element (RC Pub) 594 running on the fourth mission system component by way of the third virtual link 565.

Publisher elements may also connect to multiple subscribers to provide duplicate data to different subscribers on, for example, different components, but may create multiple connections to individual subscribers, or to different subscribers on the same component. Similarly, subscriber elements may receive data from multiple virtual links, from one or more publishers. For example, a first best effort publisher element (BE Pub) 584 on a third mission system component 582 may create a fourth virtual link 571 to a first best effort subscriber element (BE Sub) 574 running on a first mission system component 570 and to a second best effort subscriber element 580 running on a second mission system component 576. In some embodiments, a publisher element forms a single connection or single virtual link to multiple subscriber elements, and in other embodiments, a publisher element may create a separate virtual link to each subscriber element.

Each system component is not limited the number of publisher or subscriber elements that can be running thereon, or otherwise hosted or handled by a particular system component. Similarly, each system component is not limited to any particular number of incoming or outgoing virtual links beyond limitations imposed by the communications capacity of the respective element system component, EPIS 526 or POP 528, or by the configuration or capacity of the switching fabric 530. For example, the second mission system component 576 may have a first RC Pub 578 that forms a fifth virtual link 573 to a first RC Sub 572 running on a first mission system component 570. The first RC Sub 572 and first RC Pub 578 are usable on the first and second mission system components 570, 576 with the first and second BE Subs 574, 580 running on their respective host system components. However, the first and second BE Subs 574, 280 may be limited in the reception of data from the first BE Pub 584 if the first RC Pub 578 uses enough data to require throttling of data on the fourth virtual link 571 to the first and second BE subs 574, 580. Similarly, a second BE Pub 598 running on a fourth mission system component may form a sixth virtual link 575 to a third BE sub 586 running on the third mission system component 582. Communication on sixth virtual link may run to the third mission system component 582 with communication on the fourth virtual link 571, but these communications may be limited based on priorities of the virtual links, since both the fourth and sixth virtual links 571, 575 use the same type of transport mechanism.

Figure 6:
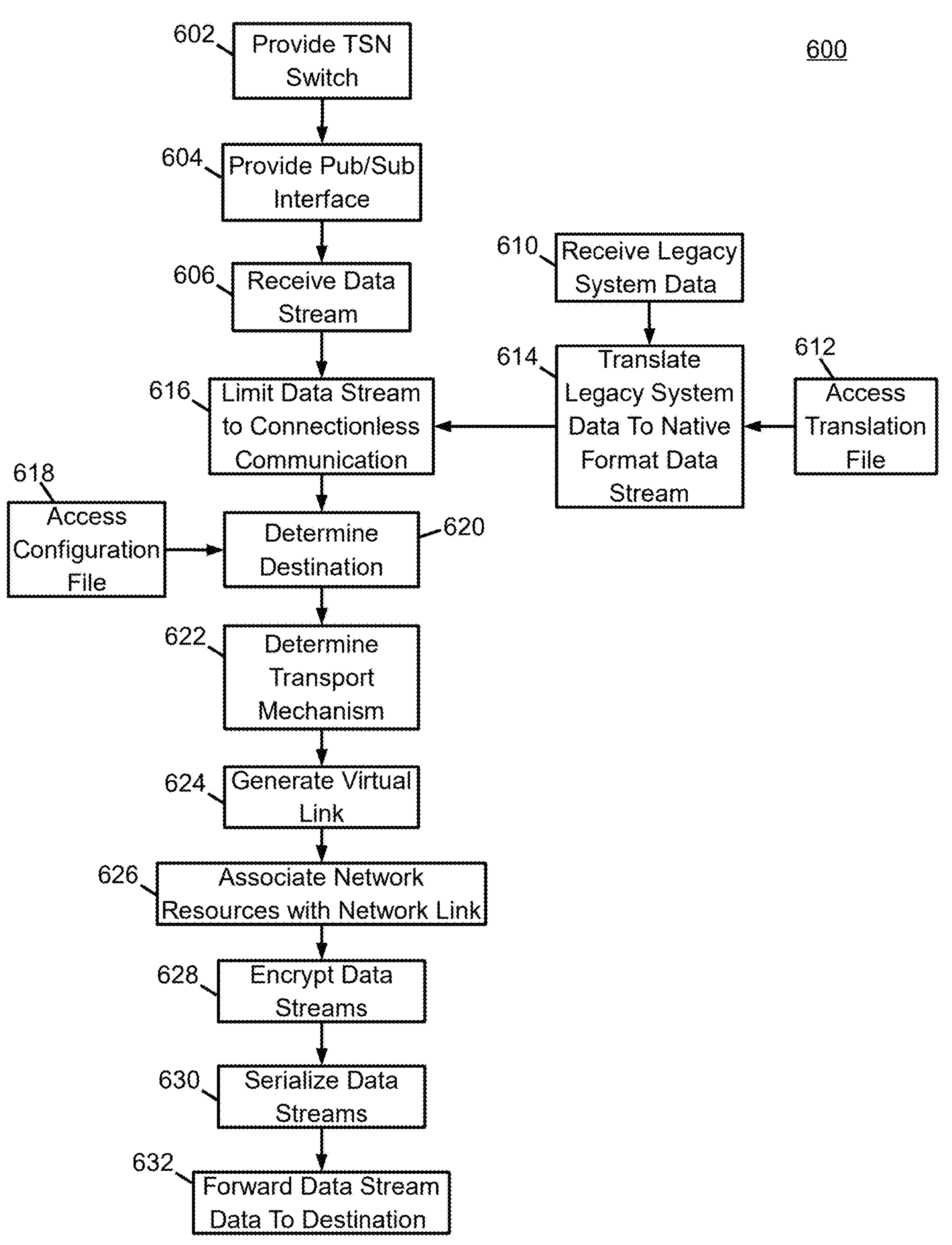
FIG. 6 is a flow diagram illustrating a method for transmission of data over a digital backbone network according to some embodiments.

FIG. 6 is a flow diagram illustrating a method 600 for transmission of data over a digital backbone network according to some embodiments. In block 602, one or more TSN switches are provided. Providing the TSN switches may include providing a new network, or providing an existing network for a new configuration or an updated configuration. Additionally, the modular nature of the network may result in providing the TSN switch including adding a new TSN switch or moving a TSN switch, or selectively connecting network elements to a TSN switch. Additionally, the TSN switches may be connected to form a digital backbone network that provides networking connectivity for transmission of messages between network elements over the digital backbone network.

In some embodiments, data is sent from a source element by forwarding data of one or more data streams. The forwarding is by at least one TSN switch to a destination network element connected to the digital backbone network, and the forwarding is performed according to a configuration file of the at least one TSN switch. The configuration file is associated with a first network element or an application providing the one or more data streams, In block 604 a publisher subscriber interface is provided. In some embodiments, each network element of the network elements utilizes a common data model associated with the digital backbone network and implementing an end point infrastructure services (EPIS) stack, wherein the EPIS stack provides endpoint data distribution services through publisher and subscriber structured typed application interfaces associated with the common data model and the digital backbone network. Thus, the method further comprises communicating, by the first network element, through an EPIS stack to publish data according to one or more configuration files. The publisher subscriber interface may, in some embodiments, permit for multicast or unicast transmission to a specific destination, rather than broadcasting data.

In block 606, a TSN switch receives a data stream. The data stream may include data from a predefined or predetermined source connected to a switch. The source may be a native system, and that uses a data format compatible with the network. Alternatively, a switch may receive data generated by a legacy system, which needs to be translated into a native format. Thus, in block 610, a GW receives data from a legacy system. In block 612, the GW accesses a translation file, and in block 614, the GW translates the legacy system data into a native format data stream according to the translation file. The translation file may be a gateway translation file that defines how data from a legacy system is translated into a native format usable by the switches of the digital backbone network, and the GW may implement the translation file to generate a native format data stream having data from the legacy system.

In block 616, the TSN switch limits the data stream to connectionless communication. For example, the TSN switch may limit communication over the digital backbone network to stateless real-time publish-subscribe communication. In some embodiments, the switch may block non stateless transmissions by, for example, only allowing one-way data transmission from a source to a destination, may limit communications to going through a stateless interface such as publisher and subscriber structured typed application interfaces provided by the EPIS stack. Additionally, in some embodiments, the TSN switch may discard any connection-based communications by not implementing a connection-based communication protocol, for example, by implementing only UDP transmission, or another connectionless transmission protocol. In yet another embodiment, the TSN switch may reject any response communications to ensure the security of transmissions. Thus, the TSN switch may limit the data stream to connectionless communication by providing only a connection less interface, limiting communications to using a connectionless communications protocol, rejecting connection-based communications, rejecting response message, or the like. The resulting system is a network where forwarding data from a first network element comprises limiting communication over the digital backbone network to connectionless communication between the first network element and a destination network element, In block 618, the TSN switch accesses a configuration file. In some embodiments, each TSN switch may have all configuration files for a network, and may load or access a configuration file based on systems connected to the particular switch, based on a system or application sending data to the switch, or at another time or in response to another event. The configuration file may be loaded according to an identifier in the configuration file that associated with the configuration file with a system or application. For example, ta configuration file may have one or more configurations for applications that may communicate through the TSN switch, and when a particular application sends a communication to the TSN to be routed to a destination, the TSN switch may load the relevant configuration file so that communication parameters, including a destination, scheduling or transmission priority, or the like, may be determined for the application. Additionally, the TSN may use the presence or absence of a relevant configuration file as a security check, with communications from applications or systems with no associated configuration or configuration file indicating that the application or system is not authorized to communicate on the network.

In block 620, the TSN switch determines a destination for data in the data stream according to the configuration file. The destination may be an identifier, address or other indicator of a network element that intended to receive, as a subscriber, data sent by a source network element, which may act as a publisher of the data stream in a publisher subscriber arrangement.

In block 622, the TSN switch determines a transport mechanism for the data according to the configuration file. In some embodiments, data is forwarded data using a transport mechanism identified in the configuration file. The transport mechanism may be one of a time aware transport service, a rate constrained transport service, or a best effort transport service. The time aware transport service is a guaranteed transport mechanism having time aware transmission slots scheduled for transmission of data, where the time aware transmission slots are scheduled in the configuration file for use by an associated data stream. The rate constrained transport service is a latency bounded transport mechanism having bandwidth limited transmission bandwidth reserved for transmission of data in bandwidth limited transmission time slots other than the time aware transmission slots. The bandwidth limited transmission bandwidth is reserved in the configuration file for use by an associated data stream. The best effort transport service is a best effort transport mechanism using best effort time slots other than the time aware transmission slots and the bandwidth limited transmission time slots and further using best effort bandwidth available outside the time aware transmission slots and other than the bandwidth limited transmission bandwidth. In some embodiments, higher priority data transmission may be made using the time aware transport service, while lower priority transmissions may use the rate constrained transport service or the best effort transport service.

In block 624, the TSN switch generates a virtual link between the TSN switch and another network element. The TSN switch may set up the virtual link as a logical path that connects two areas of a network. In block 626, the TSN switch associates network resources with the network link. In some embodiments, the TSN may assign network resources to the virtual link, or that are exclusively dedicated to transmission of data over the virtual link. The virtual link isolates data on the virtual link from other virtual links, allowing data transmitted over a common physical network segment to be logically isolated.

In block 628, the TSN switch encrypts the data stream. In some embodiments, data may be encrypted specifically for the destination network element to avoid interception of that on the network. Additionally, encrypting the data may, in some embodiments, be further used to sequester data from the data in different data streams to further ensure separation of data transmissions.

In block 630 the TSN switch serializes the data streams. In some embodiments, forwarding of the data comprises providing transmission, according to configuration files of the one or more TSN switches, in scheduled time aware transmission slots of a plurality of time aware data streams to be synchronized to serialize arrival of the time aware data streams at destinations, such as one or more flight control computers (FCC) connected to the digital backbone network.

In block 632, the TSN switch forwards the data stream data to the determined destination over the virtual link using the transport mechanism. In some embodiments, data is forwarded to the destination network element through another TSN switch so that the data stream is sent between a source switch and a destination switch. Additionally, data may be forwarded using a virtual link and transport mechanism identified in the configuration file.

An embodiment system includes a digital switching fabric system forming a digital backbone network, and one or more first system components, each first system component connected to the digital backbone network and including one or more first processors and at least one first non-transitory computer readable memory connected to the one or more first processors and including first computer program code. The at least one first non-transitory computer readable memory and the first computer program code are configured, with the one or more first processors, to cause the respective first system component to at least perform communication of data with one or more second system components over a virtual link through the digital backbone network, where the communication of the data is performed using a standardized serialization protocol and according to a transport mechanism, where the transport mechanism is predetermined according to a source of the data, where the respective first system component being caused to perform the communication of the data includes the respective first system component being caused to perform at least implementing an end point infrastructure services (EPIS) stack, where the EPIS stack provides endpoint data distribution services through a structured typed application interface associated with a common data model and the digital backbone network, where the structured typed application interface implements at least one of a publisher structured typed application interface or a subscriber structured typed application interface, and where the digital backbone network is configured to provide network connectivity for communication between the one or more first system components and the one or more second system components according to one or more configuration files and by limiting the communication to connectionless communication using transport mechanisms associated with the one or more first system components, and where each of the transport mechanisms is one of a time aware transport service, rate constrained transport service, or best effort transport service.

In some embodiments, the implementing the EPIS stack includes the EPIS stack providing endpoint data distribution services through the structured typed application interface by performing implementing a Future Airborne Capability Environment® (FACE™) compliant transport protocol module (TPM) that communicates data with an application running on the respective first system component, and implementing a protocol stack that communicates, using a POSIX (Portable Operating System Interface) socket, through multicast Internet Protocol (Multicast IP), with the TPM, and for network transport via Internet Protocol packets over the digital backbone network. In some embodiments, the one or more first system components include at least one native system component, where each native component is further caused to provide an application that communicates with the EPIS stack in a native format that is native to the structured typed application interface. In some embodiments, the one or more first system components further includes at least one non-native system component, and each non-native component further includes a legacy system that communicates legacy data in a legacy format that is non-native to the structured typed application interface, and a network gateway providing a gateway function and that is connected to the legacy system and that is configured to communicate the legacy data with the legacy system connected to the respective network gateway, and that is further configured to translate, according to a translation configuration file associated with the legacy system, the legacy data between the native format and the legacy format, and to communicate the data in the native format to the EPIS stack. In some embodiments, the time aware transport service is a guaranteed transport mechanism having time aware transmission slots scheduled for transmission of data, where the time aware transmission slots are scheduled in the configuration file for use by an associated data stream, where the rate constrained transport service is a latency bounded transport mechanism using first-in-first-out (FIFO) transmission with priority queueing for bandwidth limited transmission bandwidth in time slots other than the time aware transmission slots, where the bandwidth limited transmission bandwidth is identified in the one or more configuration files for use by an associated data stream, and where the best effort transport service is a best effort transport mechanism using FIFO transmission with priority queueing for time slots other than the time aware transmission slots and time slots used by the bandwidth limited transmission and further using bandwidth available outside the time aware transmission slots and other than the bandwidth limited transmission bandwidth. In some embodiments, the system further includes the one or more second system components, each second system component connected to the digital backbone network and including one or more second processors, and at least one second non-transitory computer readable memory connected to the one or more second processors and including second computer program code. The at least one second non-transitory computer readable memory and the second computer program code are configured, with the one or more second processors, to cause the respective second system component to at least act as a subscriber in communication of the data with one or more first system components over the virtual link through the digital backbone network using the standardized serialization protocol and according to a transport mechanism, where each first system component of the one or more first system components being caused to perform the communication of the data includes the respective first system component being caused to act as a publisher of the data to the one or more second system component, where acting as a publisher includes sending data over the virtual link to the one or more second system components through the EPIS stack and through the digital backbone network. In some embodiments, the one or more first system components include at least one flight control computer (FCC), and the digital backbone network is further configured to provide synchronization of scheduled time aware transmission slots of at least one time aware data stream to serialize arrival of the time aware data streams at the FCC. In some embodiments, communication of data for safety critical functions associated with vehicle system components over the digital backbone network is limited to the time aware transport service, where communication of data for non-safety critical functions associated with mission system components over the digital backbone network is limited to at least one of the rate constrained transport service or the best effort transport service.

An embodiments system includes one or more first system components, including one or more first processors, and at least one first non-transitory computer readable memory connected to the one or more first processors and including first computer program code. The at least one first non-transitory computer readable memory and the first computer program code are configured, with the one or more first processors, to cause the respective first system component to at least implement a first end point infrastructure services (EPIS) stack, where the first EPIS stack provides endpoint data distribution services through a structured typed application interface associated with a common data model, where the structured typed application interface implements a publisher structured typed application interface, and where the first EPIS stack is configured to provide an interface, via the publisher structured typed application interface, between a data source and a digital switching fabric system forming a digital backbone network, and perform communication of data with one or more second system components over a virtual link through the digital backbone network, where the communication of the data is performed using a standardized serialization protocol and according to a transport mechanism, where the transport mechanism is predetermined according to a source of the data and is one of a time aware transport service, a rate constrained transport service, or a best effort transport service, where performing communication of the data includes acting as a publisher of the data, where acting as the publisher includes sending the data over the virtual link to the one or more second system components through the first EPIS stack and through the digital backbone network. The system further includes one or more second system components, including one or more second processors, and at least one second non-transitory computer readable memory connected to the one or more second processors and including second computer program code. The at least one second non-transitory computer readable memory and the second computer program code are configured, with the one or more second processors, to cause the respective second system component to at least implement a second EPIS stack, where the second EPIS stack provides endpoint data distribution services through a structured typed application interface associated with the common data model, where the structured typed application interface implements at least a subscriber structured typed application interface, and where the second EPIS stack is configured to provide an interface, via the subscriber structured typed application interface, between the digital switching fabric system and a data target, and act as a subscriber in communication of the data with one or more first system components over the virtual link vie the second EPIS stack.

In some embodiments, the system further includes the digital backbone network, where each of the one or more first system components is connected to the digital backbone network, and where each of the one or more first system components is connected to the digital backbone network, where the digital backbone network is configured to provide network connectivity for communication between the one or more first system components and the one or more second system components according to one or more configuration files, and where each of the one or more first system components has an associated transport mechanism, and where the digital backbone network is further configured to provide the network connectivity by limiting the communication to connectionless communication using the associated transport mechanism for each of the one or more first system components, where the associated transport mechanism for each of the one or more first system components is indicated by the one or more configuration files. In some embodiments, the one or more second system components includes at least one flight control computer (FCC), and the digital backbone network is further configured to provide synchronization of scheduled time aware transmission slots of at least one time aware data stream to serialize arrival of the time aware data streams at the FCC. In some embodiments, the implementing the first EPIS stack includes the first EPIS stack providing endpoint data distribution services through the structured typed application interface by implementing a transport protocol module (TPM) that communicates data with an application running on the respective first system component, and implementing a protocol stack that communicates, using a POSIX (Portable Operating System Interface) socket, through multicast Internet Protocol (Multicast IP), with the TPM, and for network transport via Internet Protocol packets over the digital backbone network. In some embodiments, the one or more first system components include at least one native system component, and each native component is further caused to provide an application that communicates with the first EPIS stack in a native format that is native to the structured typed application interface. In some embodiments, the one or more first system components further includes at least one non-native system component, and each non-native component further includes a legacy system that communicates legacy data in a legacy format that is non-native to the structured typed application interface, and a network gateway providing a gateway function and that is connected to the legacy system and that is configured to communicate the legacy data with the legacy system connected to the respective network gateway, and that is further configured to translate, according to a translation configuration file associated with the legacy system, the legacy data between the native format and the legacy format, and to communicate the data in the native format to the first EPIS stack. In some embodiments, the time aware transport service is a guaranteed transport mechanism having time aware transmission slots scheduled for transmission of data, where the time aware transmission slots are scheduled in the one or more configuration files for use by an associated data stream, where the rate constrained transport service is a latency bounded transport mechanism using first-in-first-out (FIFO) transmission with priority queueing for bandwidth limited transmission bandwidth in time slots other than the time aware transmission slots, where the bandwidth limited transmission bandwidth is identified in one or more configuration files for use by an associated data stream, and where the best effort transport service is a best effort transport mechanism using FIFO transmission with priority queueing for time slots other than the time aware transmission slots and time slots used by the bandwidth limited transmission and further using bandwidth available outside the time aware transmission slots and other than the bandwidth limited transmission bandwidth. In some embodiments, communication of data for safety critical functions associated with vehicle system components over the digital backbone network is limited to the time aware transport service, and communication of data for non-safety critical functions associated with mission system components over the digital backbone network is limited to at least one of the rate constrained transport service or the best effort transport service.

An embodiment method, includes implementing, by a first system component connected to a digital backbone network of an aircraft, a first end point infrastructure services (EPIS) stack that provides endpoint data distribution services through a structured typed application interface associated with a common data model, where the structured typed application interface implements a publisher structured typed application interface, providing, by the first EPIS stack, an interface, via the publisher structured typed application interface, between a data source and a digital switching fabric system forming a digital backbone network, and performing communication of data, via a data stream generated by the first system component, with a second system component over a virtual link through the digital backbone network, where the communication of the data is performed using a standardized serialization protocol and according to a transport mechanism, where the transport mechanism is associated with the data stream and is predetermined according to a source of the data and is one of a time aware transport service, rate constrained transport service, or best effort transport service, where performing communication of the data includes acting as a publisher of the data, where acting as the publisher includes sending the data on the data stream over the virtual link to the second system component through the first EPIS stack and through the digital backbone network, implementing, by the second system component, a second EPIS stack, where the second EPIS stack provides endpoint data distribution services through a structured typed application interface associated with the common data model, where the structured typed application interface implements at least a subscriber structured typed application interface, and where the second EPIS stack is configured to provide an interface, via the subscriber structured typed application interface, between the digital switching fabric system and a data target, and acting, by the second system component, as a subscriber in communication of the data by receiving, via the second EPIS stack, the data stream from the first system component over the virtual link.

In some embodiments, the further includes providing, by the digital backbone network, network connectivity for communication od the data between the first system component and the second system component according to one or more configuration files and by limiting the communication of the data to connectionless communication using the transport mechanism associated with the data stream generated by the first system component, where the associated transport mechanism for each of the one or more first system components is indicated by the one or more configuration files. In some embodiments, the time aware transport service is a guaranteed transport mechanism having time aware transmission slots scheduled for transmission of data, where the time aware transmission slots are scheduled in the one or more configuration files for use by an associated data stream, the rate constrained transport service is a latency bounded transport mechanism using first-in-first-out (FIFO) transmission with priority queueing for bandwidth limited transmission bandwidth in time slots other than the time aware transmission slots, where the bandwidth limited transmission bandwidth is identified in the one or more configuration files for use by an associated data stream, and the best effort transport service is a best effort transport mechanism using FIFO transmission with priority queueing for time slots other than the time aware transmission slots and time slots used by the bandwidth limited transmission and further using bandwidth available outside the time aware transmission slots and other than the bandwidth limited transmission bandwidth. In some embodiments, the implementing the first EPIS stack includes providing, by the first EPIS stack, endpoint data distribution services through the structured typed application interface by communicating the data between a transport protocol module (TPM) and an application running on the first system component, and communicating, through multicast Internet Protocol (Multicast IP), the data between the TPM and a protocol stack using a POSIX (Portable Operating System Interface) socket, and providing network transport of the data to the second system component via Internet Protocol packets over the digital backbone network.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:

a digital switching fabric system forming a digital backbone network; and one or more first system components, each first system component connected to the digital backbone network and comprising:

one or more first processors; and at least one first non-transitory computer readable memory connected to the one or more first processors and including first computer program code, wherein the at least one first non-transitory computer readable memory and the first computer program code are configured, with the one or more first processors, to cause the respective first system component to at least:

perform communication of data with one or more second system components over a virtual link through the digital backbone network, wherein the communication of the data is performed using a standardized serialization protocol and according to a transport mechanism, wherein the transport mechanism is predetermined according to a source of the data;

wherein the respective first system component being caused to perform the communication of the data comprises the respective first system component being caused to perform at least:

implementing an end point infrastructure services (EPIS) stack, wherein the EPIS stack provides endpoint data distribution services through a structured typed application interface associated with a common data model and the digital backbone network, wherein the structured typed application interface implements at least one of a publisher structured typed application interface or a subscriber structured typed application interface;

wherein the digital backbone network is configured to provide network connectivity for communication between the one or more first system components and the one or more second system components according to one or more configuration files and by limiting the communication to connectionless communication using transport mechanisms associated with the one or more first system components, and wherein defined network interfaces for the digital backbone network provide for enforcement of configuration management to correctly and safely enable auto-generation of the one or more configuration files and validation artifacts; and wherein each of the transport mechanisms is one of a time aware transport service, rate constrained transport service, or best effort transport service, and wherein the digital switching fabric system is configured to simultaneously implement each of the time aware transport service, the rate constrained transport service, and the best effort transport service.

2. The system of claim 1, wherein the implementing the EPIS stack comprises the EPIS stack providing endpoint data distribution services through the structured typed application interface by performing:

implementing a Future Airborne Capability Environment® (FACE™) compliant transport protocol module (TPM) that communicates data with an application running on the respective first system component; and implementing a protocol stack that communicates, using a POSIX (Portable Operating System Interface) socket, through multicast Internet Protocol (Multicast IP), with the TPM, and for network transport via Internet Protocol packets over the digital backbone network.

3. The system of claim 1, wherein the one or more first system components comprise at least one native system component; and wherein each native component is further caused to provide an application that communicates with the EPIS stack in a native format that is native to the structured typed application interface.

4. The system of claim 3, wherein the one or more first system components further comprises at least one non-native system component; and wherein each non-native component further comprises:

a legacy system that communicates legacy data in a legacy format that is non-native to the structured typed application interface; and a network gateway providing a gateway function and that is connected to the legacy system and that is configured to communicate the legacy data with the legacy system connected to the respective network gateway, and that is further configured to translate, according to a translation configuration file associated with the legacy system, the legacy data between the native format and the legacy format, and to communicate the data in the native format to the EPIS stack.

5. The system of claim 1, wherein the time aware transport service is a guaranteed transport mechanism having time aware transmission slots scheduled for transmission of data, wherein the time aware transmission slots are scheduled in the configuration file for use by an associated data stream;

wherein the rate constrained transport service is a latency bounded transport mechanism using first-in-first-out (FIFO) transmission with priority queueing for bandwidth limited transmission bandwidth in time slots other than the time aware transmission slots, wherein the bandwidth limited transmission bandwidth is identified in the one or more configuration files for use by an associated data stream; and wherein the best effort transport service is a best effort transport mechanism using FIFO transmission with priority queueing for time slots other than the time aware transmission slots and time slots used by the bandwidth limited transmission bandwidth and further using bandwidth available outside the time aware transmission slots and other than the bandwidth limited transmission bandwidth.

6. The system of claim 1, further comprising:

the one or more second system components, each second system component connected to the digital backbone network and comprising:

one or more second processors; and at least one second non-transitory computer readable memory connected to the one or more second processors and including second computer program code, wherein the at least one second non-transitory computer readable memory and the second computer program code are configured, with the one or more second processors, to cause the respective second system component to at least:

act as a subscriber in communication of the data with the one or more first system components over the virtual link through the digital backbone network using the standardized serialization protocol and according to a transport mechanism;

wherein each first system component of the one or more first system components being caused to perform the communication of the data comprises the respective first system component being caused to act as a publisher of the data to the one or more second system components, wherein acting as the publisher comprises sending data over the virtual link to the one or more second system components through the EPIS stack and through the digital backbone network.

7. The system of claim 6, wherein the one or more first system components comprise at least one flight control computer (FCC); and wherein the digital backbone network is further configured to provide synchronization of scheduled time aware transmission slots of at least one time aware data stream to serialize arrival of the time aware data streams at the FCC.

8. The system of claim 6, wherein communication of data for safety critical functions associated with vehicle system components over the digital backbone network is limited to the time aware transport service, wherein communication of data for non-safety critical functions associated with mission system components over the digital backbone network is limited to at least one of the rate constrained transport service or the best effort transport service.

9. A system, comprising:

one or more first system components, each first system component of the one or more first system components comprising:

one or more first processors; and at least one first non-transitory computer readable memory connected to the one or more first processors and including first computer program code, wherein the at least one first non-transitory computer readable memory and the first computer program code are configured, with the one or more first processors, to cause the respective first system component to at least:

implement a first end point infrastructure services (EPIS) stack, wherein the first EPIS stack provides endpoint data distribution services through a structured typed application interface associated with a common data model, wherein the structured typed application interface implements a publisher structured typed application interface, and wherein the first EPIS stack is configured to provide an interface, via the publisher structured typed application interface, between a data source and a digital switching fabric system forming a digital backbone network, and wherein defined network interfaces for the digital backbone network provide for enforcement of configuration management to correctly and safely enable auto-generation of one or more configuration files and validation artifacts; and perform communication of data with one or more second system components over a virtual link through the digital backbone network, wherein the communication of the data is performed using a standardized serialization protocol and according to a transport mechanism, wherein the transport mechanism is predetermined according to a source of the data and is one of a time aware transport service, a rate constrained transport service, or a best effort transport service, wherein performing communication of the data comprises acting as a publisher of the data, wherein acting as the publisher comprises sending the data over the virtual link to the one or more second system components through the first EPIS stack and through the digital backbone network; and one or more second system components, each of the one or more second system components comprising:

one or more second processors; and at least one second non-transitory computer readable memory connected to the one or more second processors and including second computer program code, wherein the at least one second non-transitory computer readable memory and the second computer program code are configured, with the one or more second processors, to cause the respective second system component to at least:

implement a second EPIS stack, wherein the second EPIS stack provides endpoint data distribution services through a structured typed application interface associated with the common data model, wherein the structured typed application interface implements at least a subscriber structured typed application interface, and wherein the second EPIS stack is configured to provide an interface, via the subscriber structured typed application interface, between the digital switching fabric system and a data target; and act as a subscriber in communication of the data with the one or more first system components over the virtual link via the second EPIS stack;

wherein the at least one first non-transitory computer readable memory, the first computer program code and the one or more first processors of a third system component of the one or more first system components are configured to cause the third system component to perform the communication of the data with the one or more second system components according to a transport mechanism that is different from a transport mechanism used by a fourth system component of the one or more first system components for communication of data.

10. The system of claim 9, further comprising the digital backbone network, wherein each of the one or more first system components is connected to the digital backbone network, and wherein each of the one or more second system components is connected to the digital backbone network;

wherein the digital backbone network is configured to provide network connectivity for communication between the one or more first system components and the one or more second system components according to one or more configuration files; and wherein each of the one or more first system components has an associated transport mechanism, and wherein the digital backbone network is further configured to provide the network connectivity by limiting the communication to connectionless communication using the associated transport mechanism for each of the one or more first system components, wherein the associated transport mechanism for each of the one or more first system components is indicated by the one or more configuration files.

11. The system of claim 10, wherein the one or more second system components comprises at least one flight control computer (FCC); and wherein the digital backbone network is further configured to provide synchronization of scheduled time aware transmission slots of at least one time aware data stream to serialize arrival of the time aware data streams at the FCC.

12. The system of claim 9, wherein the implementing the first EPIS stack comprises the first EPIS stack providing endpoint data distribution services through the structured typed application interface by:

implementing a transport protocol module (TPM) that communicates data with an application running on the respective first system component; and implementing a protocol stack that communicates, using a POSIX (Portable Operating System Interface) socket, through multicast Internet Protocol (Multicast IP), with the TPM, and for network transport via Internet Protocol packets over the digital backbone network.

13. The system of claim 9, wherein the one or more first system components comprise at least one native system component; and wherein each native component is further caused to provide an application that communicates with the first EPIS stack in a native format that is native to the structured typed application interface.

14. The system of claim 13, wherein the one or more first system components further comprises at least one non-native system component; and wherein each non-native component further comprises:

a legacy system that communicates legacy data in a legacy format that is non-native to the structured typed application interface; and a network gateway providing a gateway function and that is connected to the legacy system and that is configured to communicate the legacy data with the legacy system connected to the respective network gateway, and that is further configured to translate, according to a translation configuration file associated with the legacy system, the legacy data between the native format and the legacy format, and to communicate the data in the native format to the first EPIS stack.

15. The system of claim 9, wherein the time aware transport service is a guaranteed transport mechanism having time aware transmission slots scheduled for transmission of data, wherein the time aware transmission slots are scheduled in the one or more configuration files for use by an associated data stream;

wherein the rate constrained transport service is a latency bounded transport mechanism using first-in-first-out (FIFO) transmission with priority queueing for bandwidth limited transmission bandwidth in time slots other than the time aware transmission slots, wherein the bandwidth limited transmission bandwidth is identified in one or more configuration files for use by an associated data stream; and wherein the best effort transport service is a best effort transport mechanism using FIFO transmission with priority queueing for time slots other than the time aware transmission slots and time slots used by the bandwidth limited transmission bandwidth and further using bandwidth available outside the time aware transmission slots and other than the bandwidth limited transmission bandwidth.

16. The system of claim 15, wherein communication of data for safety critical functions associated with vehicle system components over the digital backbone network is limited to the time aware transport service, wherein communication of data for non-safety critical functions associated with mission system components over the digital backbone network is limited to at least one of the rate constrained transport service or the best effort transport service.

17. A method, comprising:

implementing, by a first system component connected to a digital backbone network of an aircraft, a first end point infrastructure services (EPIS) stack that provides endpoint data distribution services through a structured typed application interface associated with a common data model, wherein the structured typed application interface implements a publisher structured typed application interface;

providing, by the first EPIS stack, an interface, via the publisher structured typed application interface, between a data source and a digital switching fabric system forming a digital backbone network, wherein defined network interfaces for the digital backbone network provide for enforcement of configuration management to correctly and safely enable auto-generation of one or more configuration files and validation artifacts;

performing communication of data, via a data stream generated by the first system component, with a second system component over a virtual link through the digital backbone network, wherein the communication of the data is performed using a standardized serialization protocol and according to a transport mechanism, wherein the transport mechanism is associated with the data stream and is predetermined according to a source of the data and is one of a time aware transport service, rate constrained transport service, or best effort transport service, wherein performing communication of the data comprises acting as a publisher of the data, wherein acting as the publisher comprises sending the data on the data stream over the virtual link to the second system component through the first EPIS stack and through the digital backbone network;

implementing, by the second system component, a second EPIS stack, wherein the second EPIS stack provides endpoint data distribution services through a structured typed application interface associated with the common data model, wherein the structured typed application interface implements at least a subscriber structured typed application interface, and wherein the second EPIS stack is configured to provide an interface, via the subscriber structured typed application interface, between the digital switching fabric system and a data target; and acting, by the second system component, as a subscriber in communication of the data by receiving, via the second EPIS stack, the data stream from the first system component over the virtual link;

wherein the transport mechanism used by the first system component to perform the communication of the data is different from a transport mechanism used by a third system component, which is connected to the digital backbone network, for communication of data.

18. The method of claim 17, further comprising:

providing, by the digital backbone network, network connectivity for communication of the data between the first system component and the second system component according to the one or more configuration files and by limiting the communication of the data to connectionless communication using the transport mechanism associated with the data stream generated by the first system component, wherein the associated transport mechanism for the first system component is indicated by the one or more configuration files.

19. The method of claim 18, wherein the time aware transport service is a guaranteed transport mechanism having time aware transmission slots scheduled for transmission of data, wherein the time aware transmission slots are scheduled in the one or more configuration files for use by an associated data stream;

wherein the rate constrained transport service is a latency bounded transport mechanism using first-in-first-out (FIFO) transmission with priority queueing for bandwidth limited transmission bandwidth in time slots other than the time aware transmission slots, wherein the bandwidth limited transmission bandwidth is identified in the one or more configuration files for use by an associated data stream; and wherein the best effort transport service is a best effort transport mechanism using FIFO transmission with priority queueing for time slots other than the time aware transmission slots and time slots used by the bandwidth limited transmission bandwidth and further using bandwidth available outside the time aware transmission slots and other than the bandwidth limited transmission bandwidth.

20. The method of claim 17, wherein the implementing the first EPIS stack comprises providing, by the first EPIS stack, endpoint data distribution services through the structured typed application interface by:

communicating the data between a transport protocol module (TPM) and an application running on the first system component; and communicating, through multicast Internet Protocol (Multicast IP), the data between the TPM and a protocol stack using a POSIX (Portable Operating System Interface) socket; and providing network transport of the data to the second system component via Internet Protocol packets over the digital backbone network.

* * * * *